United States Patent
Kuan et al.

(10) Patent No.: US 10,182,579 B1
(45) Date of Patent: Jan. 22, 2019

(54) METHOD OF MAKING A MEAT PRODUCT AND A MEAT PRODUCT

(71) Applicant: TYSON FOODS, INC., Springdale, AR (US)

(72) Inventors: Naikang Kuan, Wheaton, IL (US); Paul Thomas Connor, LeMars, IA (US)

(73) Assignee: Tyson Foods, Inc., Springdale, AR (US)

( * ) Notice: Subject to any disclaimer, the term of this patent is extended or adjusted under 35 U.S.C. 154(b) by 0 days.

(21) Appl. No.: 15/932,310

(22) Filed: Feb. 16, 2018

Related U.S. Application Data

(60) Provisional application No. 62/459,728, filed on Feb. 16, 2017, provisional application No. 62/569,282, filed on Oct. 6, 2017.

(51) Int. Cl.
*A22C 17/00* (2006.01)
*A23L 13/00* (2016.01)

(52) U.S. Cl.
CPC ........ *A22C 17/002* (2013.01); *A22C 17/0033* (2013.01); *A23L 13/00* (2016.08)

(58) Field of Classification Search
CPC ... A22C 17/00; A22C 17/0006; A22C 17/002; A22C 17/0026; A22C 17/0033; A22C 21/00
USPC ................ 452/125, 127, 135, 141, 148, 149
See application file for complete search history.

(56) References Cited

U.S. PATENT DOCUMENTS

| | | | | |
|---|---|---|---|---|
| 5,525,103 | A * | 6/1996 | White | A22B 5/0029 452/135 |
| 5,932,278 | A * | 8/1999 | Gagliardi, Jr. | A23L 13/50 426/518 |
| 5,951,392 | A * | 9/1999 | Gagliardi | A22C 17/0006 452/125 |
| 6,238,281 | B1 * | 5/2001 | Gagliardi, Jr. | A22C 21/003 452/135 |
| 6,939,217 | B2 * | 9/2005 | Gagliardi, Jr. | A22C 21/0023 452/149 |
| 7,134,958 | B2 * | 11/2006 | Gagliardi, Jr. | A22C 21/0023 452/149 |
| 7,175,517 | B1 * | 2/2007 | Weakley | A22C 21/0038 452/149 |

(Continued)

FOREIGN PATENT DOCUMENTS

CA 2033789 A1 7/1991

*Primary Examiner* — Richard T Price, Jr.
(74) *Attorney, Agent, or Firm* — McAfee & Taft, A Professional Corporation

(57) ABSTRACT

The present disclosure describes new meat products and new processing and cutting techniques that more effectively utilize an animal carcass. A method of forming one or more bone-in products and one or more boneless meat products from the same segment of carcass are disclosed. The bone-in meat products and boneless meat products are formed by dividing a carcass segment having at least three rib bones into a bone-in meat portion and a boneless meat portion. The bone-in meat portion has a portion of rib bones exposed and a generally cylindrically meat member spanning its length. The boneless meat portion may be a formed by enveloping the meat portion with a flap created from attached fat or skin of the boneless meat portion thereby forming a boneless meat product that is a continuous piece of material and generally cylindrical in shape.

34 Claims, 24 Drawing Sheets

(56) References Cited

U.S. PATENT DOCUMENTS

| 7,666,075 | B1 | 2/2010 | Baker et al. |
| 7,959,500 | B1 | 6/2011 | Baker et al. |
| 8,727,840 | B2 | 5/2014 | Connor et al. |
| 2016/0037788 | A1 | 2/2016 | Corbin et al. |

\* cited by examiner

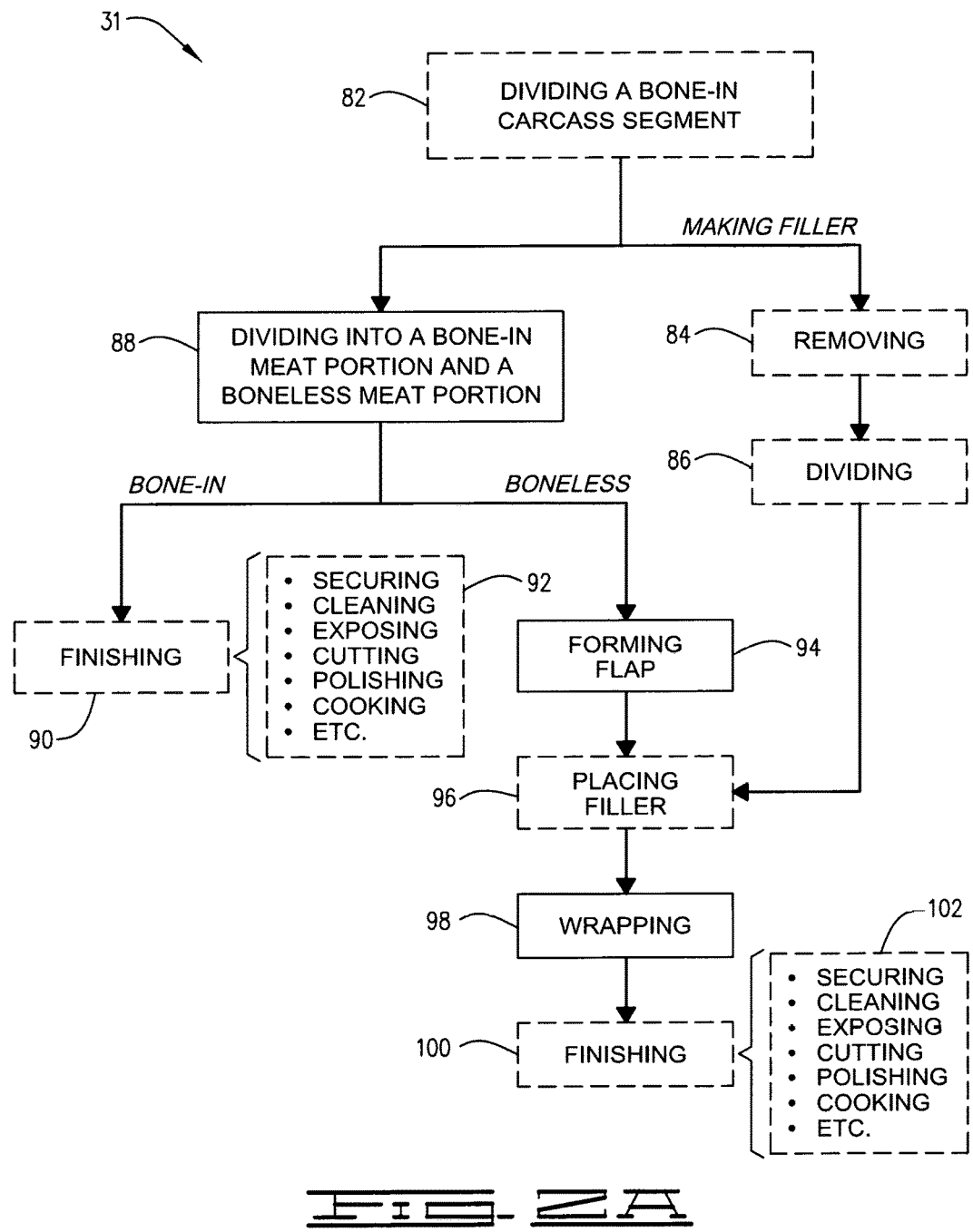

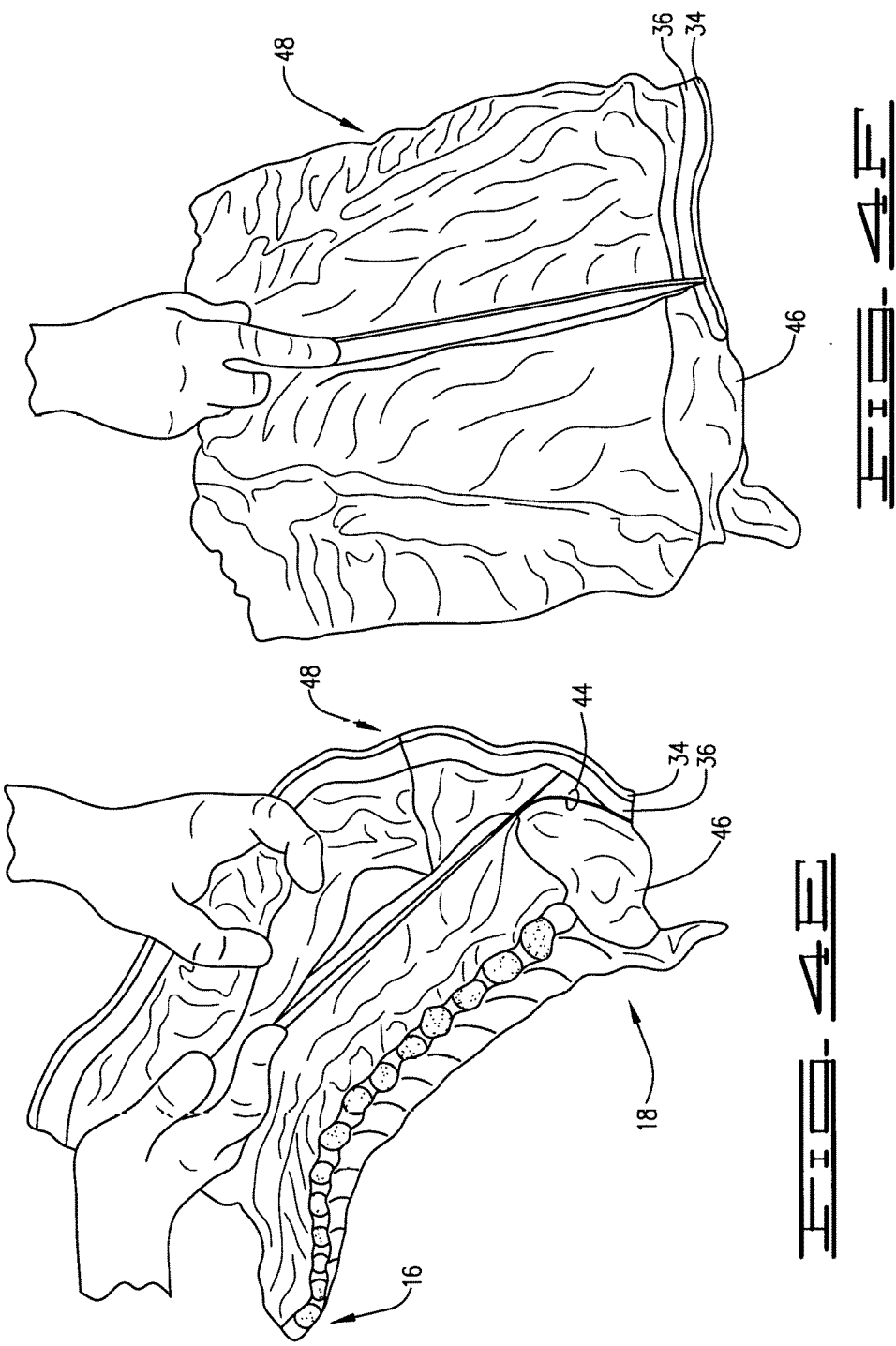

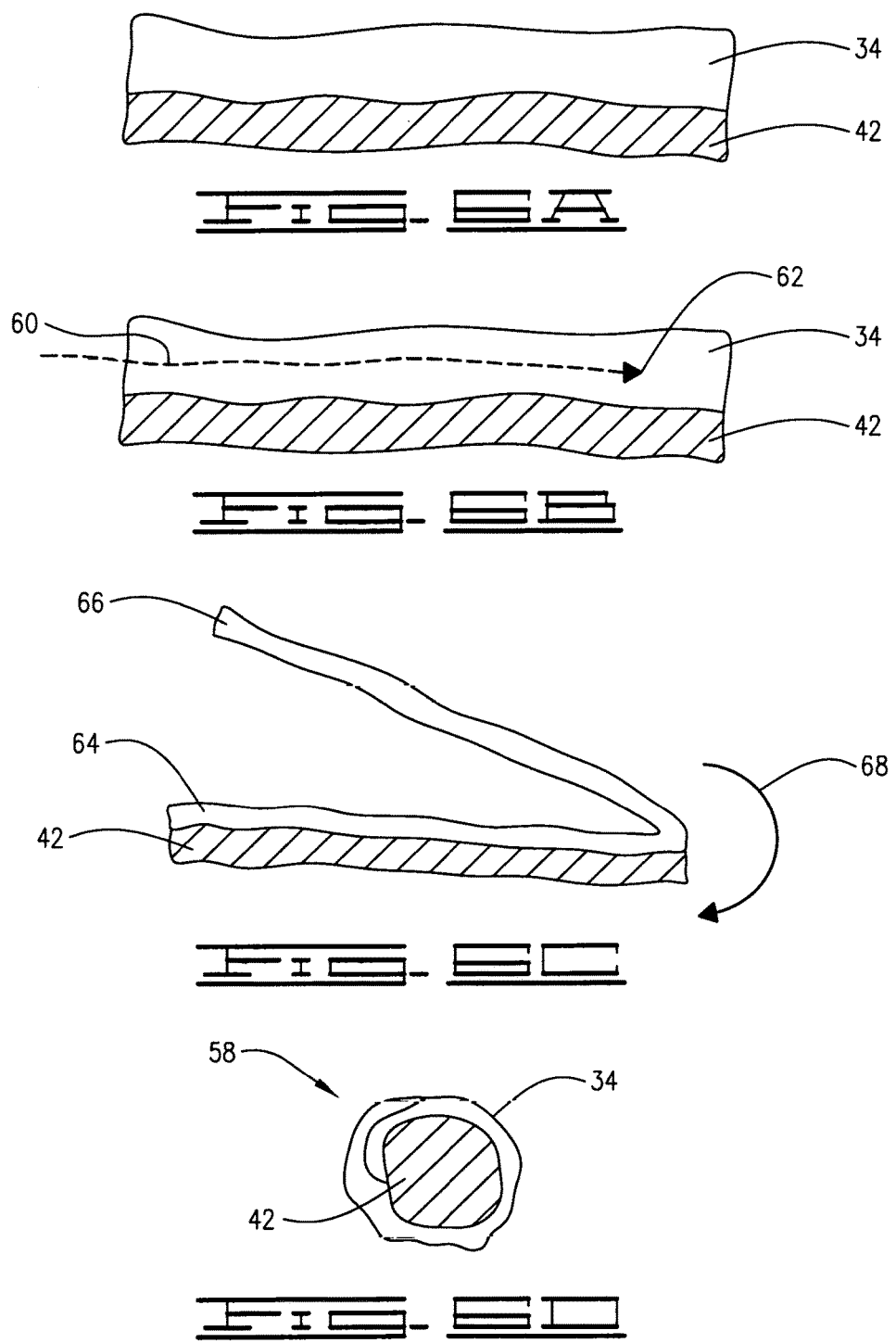

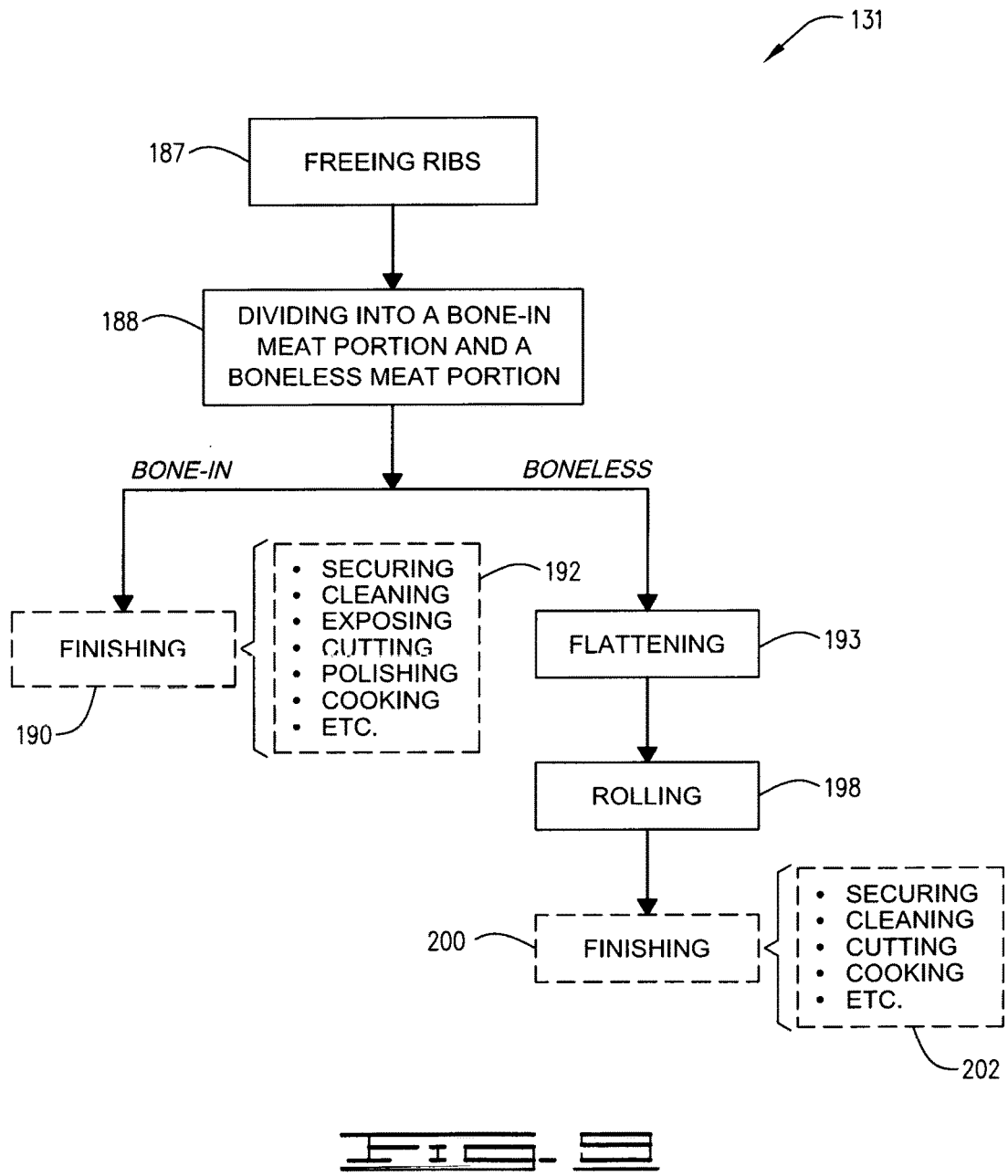

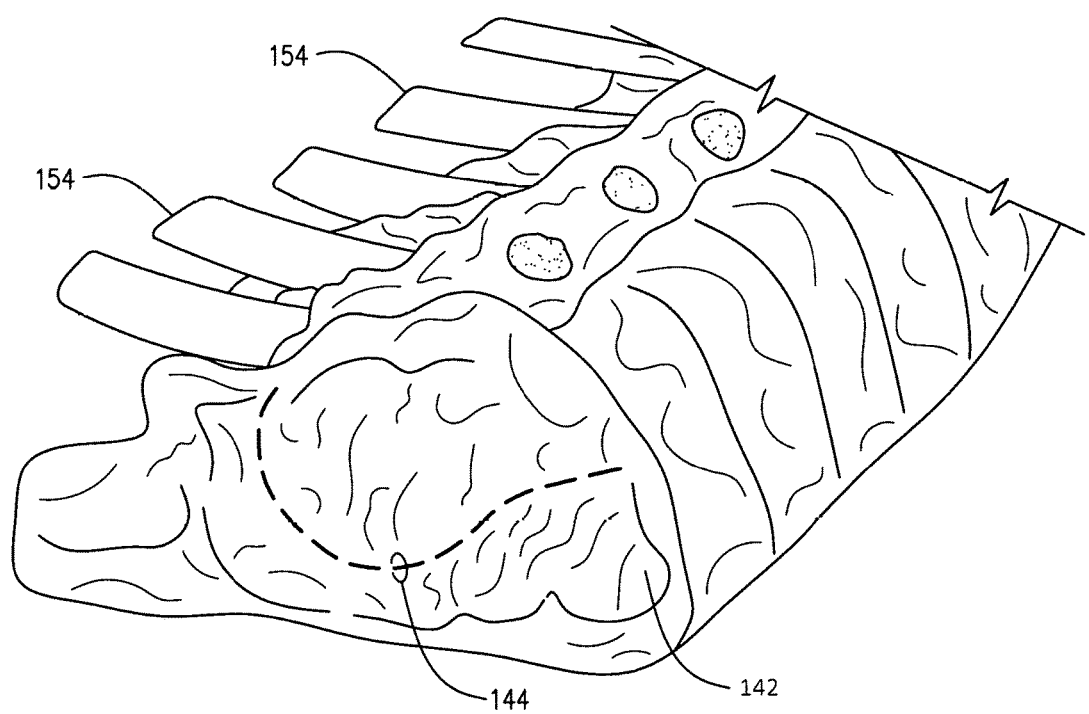

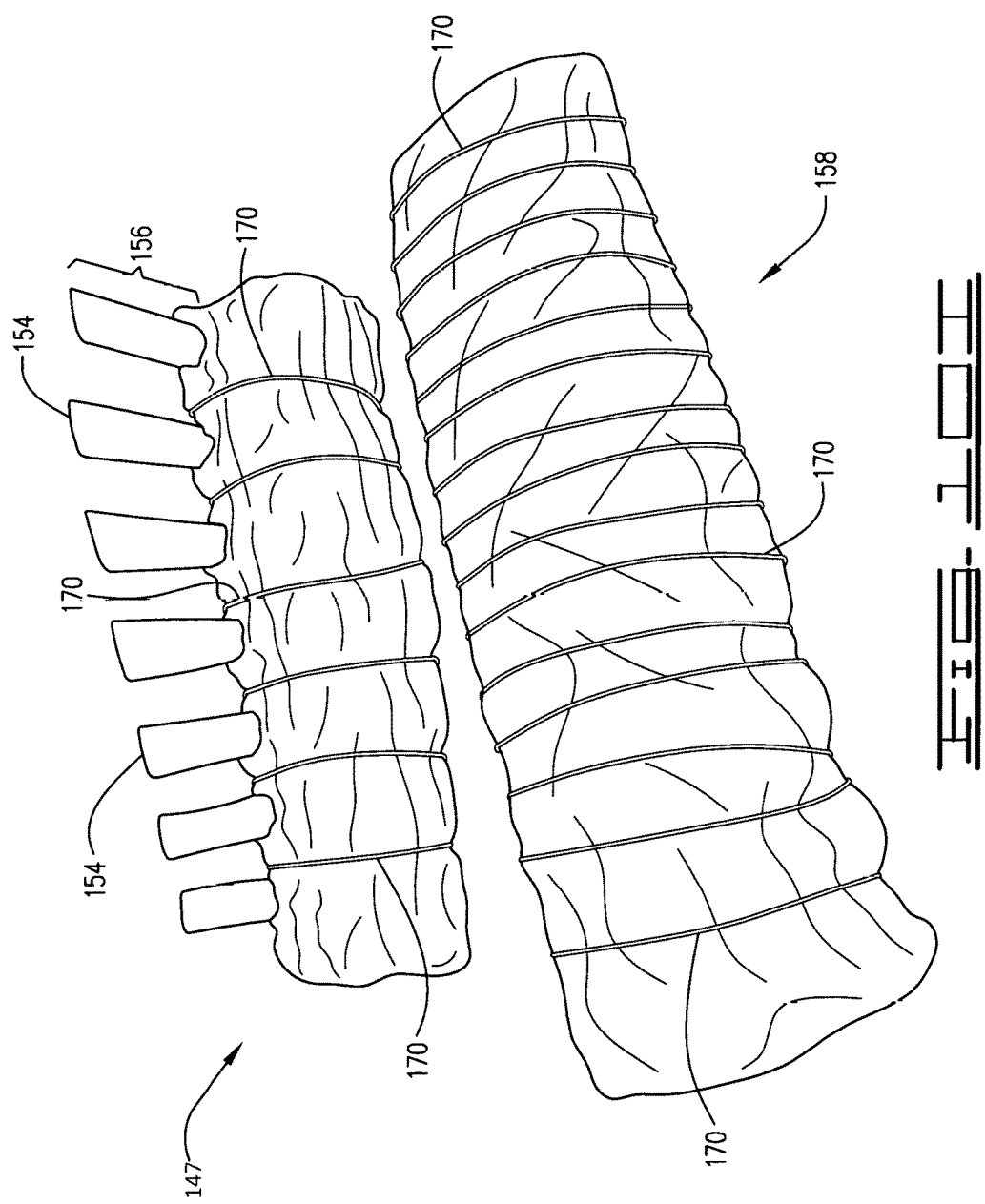

METHOD OF MAKING A MEAT PRODUCT AND A MEAT PRODUCT

CROSS-REFERENCE TO RELATED APPLICATION

This application claims priority from U.S. Provisional Patent Application Ser. No. 62/459,728, filed Feb. 16, 2017, and U.S. Provisional Patent Application Ser. No. 62/569,282, filed Oct. 6, 2017, the entire contents of which are each incorporated herein by reference.

BACKGROUND

The meat-producing industry is seeing heavier carcasses than before. As a result of the heavier carcasses, the meat-producing industry, i.e. fabricators, experiences increased costs associated with the processing of the increased-size carcass and the manufacturing of meat products therefrom, including increased labor, shipping, and handling.

For example, with increasing live swine weights, the meat-producing industry is seeing heavier swine carcasses. In the past, the average live weight was approximately 250-270 pounds, now at time of slaughter, swine weigh about 285-300 pounds on average. Increased swine weight directly correlates to an increase in the primal and sub-primal size.

Consumers are generally not interested in buying larger portion sizes, nor are consumers interested in consuming unrecognizable meat products. Efforts to maintain recognizable meat products for consumers and portion sizes that consumers are willing to buy cause the fabricators to not utilize the carcass as fully and/or cost-effectively, e.g. discarding of portions of meat for use in the lesser-valued trim in order to fabricate the more traditional products and thereby experience more decreasing drop credits values. Fabricators also experience increased costs associated with the manufacture of certain labor-intensive meat products and must find ways to offset the higher-cost manufacture of certain meat products.

SUMMARY

The present disclosure describes new meat products and new processing and cutting techniques that more effectively utilize the animal carcass to make new economical, appetizing, and aesthetically pleasing products available to the consuming public in an industry where there has been a scantiness of any new methods, innovations, and products. The new meat products, new processing and cutting techniques and the meat products produced therefrom allow fabricators to more effectively utilize the carcass, control costs associated with manufacture and fabrication of the carcass, and provide new and innovative meat products that can be offered economically and efficiently, including increasing throughput and/or providing the ability to effectively store more meat products within the same space than compared to current traditional meat products. The new meat products, new processing and cutting techniques and the meat products produced therefrom also allow the fabricators to receive economic benefits by increasing the drop credit value, use the previously-discarded meat portions for new products that can be valued up, and maintain the ability to use other portions of the carcass to fabricate other meat products, including current "traditional" meat products.

A method of forming a bone-in meat portion and a boneless meat product from a carcass segment is disclosed. The carcass segment has at least three rib bones and the carcass segment has a length defined between an anterior end and a posterior end. The method comprises the steps of: dividing the carcass segment along the length of the carcass segment and thereby form a boneless meat portion and a bone-in meat portion. Wherein the bone-in meat portion has the at least three rib bones. Wherein the bone-in meat portion has a length defined between an anterior end and posterior end of the bone-in meat portion and the boneless meat portion has a length defined between an anterior end and a posterior end of the boneless meat portion and the boneless meat portion includes a meat member that has a thickness of at least 1 inch as measured between a ventral side and a dorsal side of the boneless meat portion. Wherein the bone-in meat portion includes a generally rounded meat member attached to one end of each of the at least three rib bones and the generally rounded meat member spans the length of the bone-in meat portion and the generally rounded meat member has a diameter of about at least 2.5 inches. The method further includes the step of forming the boneless meat portion into a generally cylindrically-shaped meat portion along the length of the boneless meat portion and thereby form the boneless meat product.

A boneless meat product that is substantially cylindrically-shaped is disclosed. The boneless meat product comprises a meat portion wrapped in and surrounded by a continuous layer of fat. Wherein the meat portion has a thickness as measured between a ventral side and a dorsal side or the meat portion. Wherein the continuous layer of fat is formed by splitting a fat member attached with the meat portion into a flap portion and a stationary portion of fat with the stationary portion of fat remaining attached to the meat portion. Wherein the fat member has a thickness defined between a ventral side and a dorsal side of the fat member, and the thickness of the fat member is greater than the thickness of the meat portion, and wherein the flap portion is in contact with an exposed surface of the meat portion.

A method of forming a boneless meat product from a sirloin sub-primal of a pork carcass segment. The pork carcass segment includes an export belly, a sirloin meat portion, skin, and fat attached to the pork carcass segment. The method comprises the step of forming a flap of skin and fat portions of the export belly by dividing a meat portion of the export belly from the skin and the fat portions of the pork carcass segment attached to the export belly thereby removing the meat portion of the export belly from the carcass segment while leaving substantially intact the fat and skin portions of the export belly attached to skin and fat portions of the sirloin meat portion. The method further comprises the step of forming the boneless meat product by wrapping the flap substantially around the sirloin meat portion and the skin and fat portions attached to the sirloin meat portion, wherein the boneless meat product is generally cylindrically-shaped.

A boneless pork sirloin meat product that is substantially cylindrically-shaped is disclosed. The boneless pork sirloin meat product comprises a boneless meat portion wrapped in and surrounded by a continuous layer of skin. Wherein the continuous layer of skin includes skin attached to a portion of the meat portion and a skin flap formed by removing a belly portion from a sirloin portion without removing skin attached to the belly portion thereby forming the skin flap portion of the continuous layer of skin.

BRIEF DESCRIPTION OF THE DRAWINGS

FIG. 2A is an example flow chart for a method of forming a bone-in meat product and a boneless meat product.

FIGS. 4C-4F depict visual illustrations of a dividing step of the method depicted in FIGS. 2A and 2B.

FIGS. 6A-6D depict example visual illustrations of various steps of the method depicted in FIGS. 2A and 2B applied to a boneless meat portion having a fat member attached to a meat member.

FIG. 9 is an example flow chart for the presently disclosed method of forming a bone-in meat product and a boneless meat product as applied to a beef carcass.

FIG. 10C is a visual illustration of the bone-in carcass segment of FIG. 10A depicting a posterior-end view (loin-end view) and score serving as a guiding cut line within the ribeye meat portion of the bone-in beef carcass segment.

FIGS. 10F and 10G depict visual illustrations of certain processing steps of the method depicted in FIG. 9.

FIGS. 10H and 10I depict a bone-in meat product and boneless meat product after undergoing one or more finishing steps of the method depicted in FIG. 9.

DETAILED DESCRIPTION

Figure 1A:
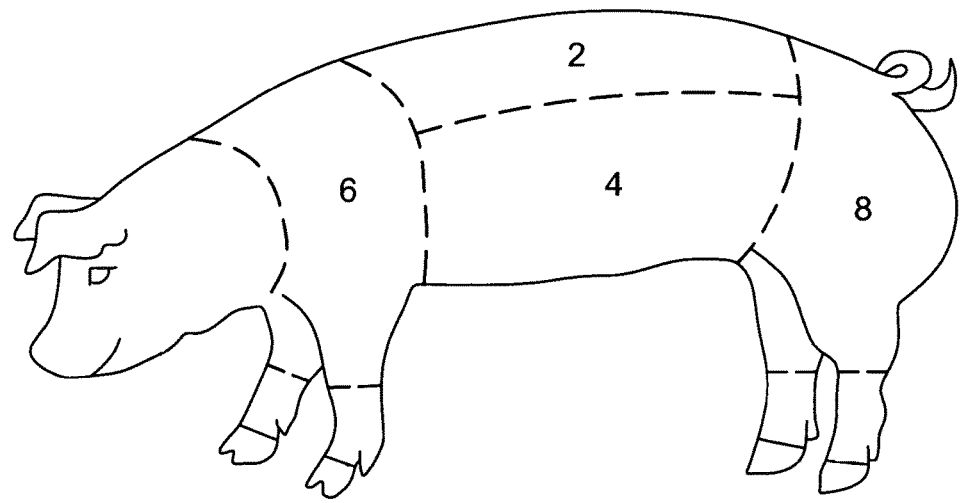
FIG. 1A illustrates primal cuts of a pig.

As used herein, the terms "pig," "swine," "hog," and the like are used interchangeably and refer any animal of the Suidae family commonly used in association with the production and consumption of its meat, i.e. pork. Nothing herein shall limit this disclosure to the domestic pig or any other domesticated animal for which the described processing and cutting techniques may be used. For ease of readability, the present disclosure is made in reference to pigs; however, the disclosed processing and cutting techniques and resulting meat products are also applicable to other animals, including, without limitation, cattle, lamb, and deer, and the applicable animal's associated primal and sub-primal cuts.

As used herein, the phrase "substantially intact" when used in reference to a muscle group includes any associated fat, within a particular portion of interest, e.g., primal, sub-primal, carcass cut. The substantially intact muscle group has approximately 50% or above of the initial muscle and fat material present in that portion of the applicable primal or sub-primal. The substantially intact muscle and fat is not based on a percentage of the total muscle material for the particular muscle present in the entire carcass (if such muscle is found in other primal or sub-primal cuts).

As used herein, the phrase "consisting essentially of" used in connection with a specific muscle or group of muscles refers to the muscle plus the seams associated with muscle(s) and possibly also minor proportions, approximately less than or equal to 1% of other muscles and carcass materials. Carcass materials include all materials, fluids, and bone fragments of the carcass. As used herein, "undesirable components" includes any material or component that may affect the aesthetic and/or appetizing appearance of the meat product to consumers and may adversely affect a pleasant culinary experience by the consumer. Examples of undesirable components may include material such as excess fat, blood clots, bruises, bone chips, cartilage, intermuscular seams, and/or extraneous material present on the meat due to the cutting process, such as, but not limited to, bone fragments that fall on the meat during deboning. As used herein, "associated seams" includes membranes and/or connective tissue, including intermuscular seams. As used herein, the term "consumers" includes all levels of consumers of the meat product, including wholesale consumers, food-industry consumers, retail consumers, and any consumer of any of the foregoing, and individuals that consume the meat product.

The terms of approximation, including, "generally," "substantially," "about," "approximately," and the like, and each of their respective variants and derivatives will be understood to allow for minor variations and/or deviations that do not result in a significant impact thereto. Such terms of approximation should be interpreted according to their ordinary and customary meanings as used in the associated art unless indicated otherwise. Absent a specific definition and absent ordinary and customary usage in the associated art, such terms should be interpreted to be ±10% of the base value. The use of ordinal number terminology (i.e., "first," "second," "third," "fourth," etc.) is for the purpose of differentiating between two or more items and is not meant to imply any sequence or order or importance to one item over another or any order of addition. The term "or combinations thereof" as used herein refers to all permutations and combinations of the listed items preceding the term. The skilled artisan will understand that typically there is no limit on the number of items or terms in any combination, unless otherwise apparent from the context.

As will be used herein, directional terms, such as "above," "below," "upper," "lower," "top," etc. and/or terms as they pertain to the carcass, including "medial," "lateral," "cavity-side," "skin-side," "bone-side," and "meat-side" illustrate general points of reference pertaining to quadrupeds and/or anatomical axes for quadrupeds and are used for convenience in referring to the accompanying drawings and descriptions thereof and are not intended to limit the scope of the appended claims. For example, with reference to ribs of a carcass, the "cavity-side," "membrane-side," or "bone-side" refer to the portion of the ribs that is medial or closer to the median plane or located along or toward the middle or interior of the carcass; and "meat-side," "lean-side," or "lateral side" refer to the outer portion of the ribs that have more meat thereon and are closer to the lateral side or skin-side or exterior of the carcass and away from the median plane of the carcass.

For illustrative purposes of the present disclosure, the figures depict the disclosed methods, processing steps, and techniques, and the resulting products as performed manually. Such illustration shall not be construed to be limited to being performed manually or solely by hand or other manual techniques. The disclosed methods, processing steps, and techniques may be done manually, automatically, semi-automatically, or combinations of any of the foregoing. The present disclosure includes references to cutting, dividing, and separating steps; such steps are achieved by any method known in the art. Non-limiting examples of cutting, dividing, and separating devices include: automated, manual, or mechanized cutting devices, such as, but not limited to, a knife or knives; rotary knives; saws of all types, including pneumatic saws, hand saws, and band saws; shears; multi-blade cutting systems; fluid jets; pullers; and any combination of one or more of each of any of the foregoing.

Figure 1B:
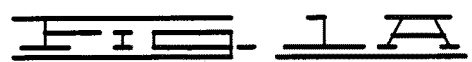
FIG. 1B illustrates some sub-primal cuts of a pig.

FIG. 1A depicts four primal cuts of a pig, the loin 2, belly 4, shoulder 6, and leg or ham 8. FIG. 1B illustrates some sub-primal cuts of a pig, the loin 2, belly 4, sparerib 5, leg or ham 8, blade or Boston butt 10 of shoulder 6, picnic shoulder 12.

Figure 1C:
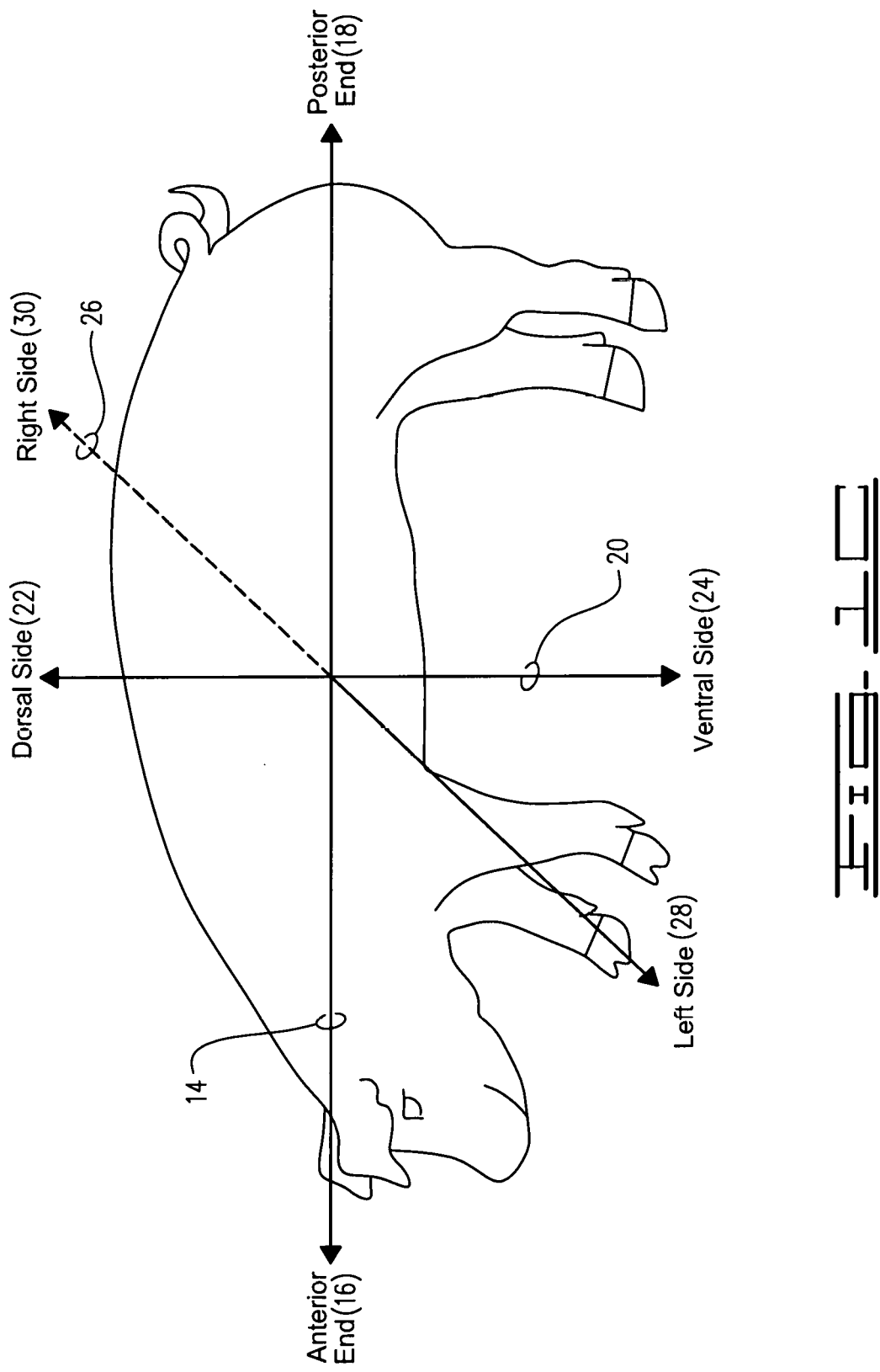
FIG. 1C illustrates general points of reference pertaining to anatomical axes for quadrupeds.

FIG. 1C illustrates some general points of reference pertaining to anatomical axes for quadrupeds. For example, the anterior-posterior axis 14 with the anterior end 16 and posterior end 18 labeled in the direction shown. The dorsal-ventral axis 20 with the dorsal side 22 and ventral side 24 labeled in the direction shown. The left-right axis 26 with the left side 28 and right side 30 labeled in the direction shown.

Figure 2B:
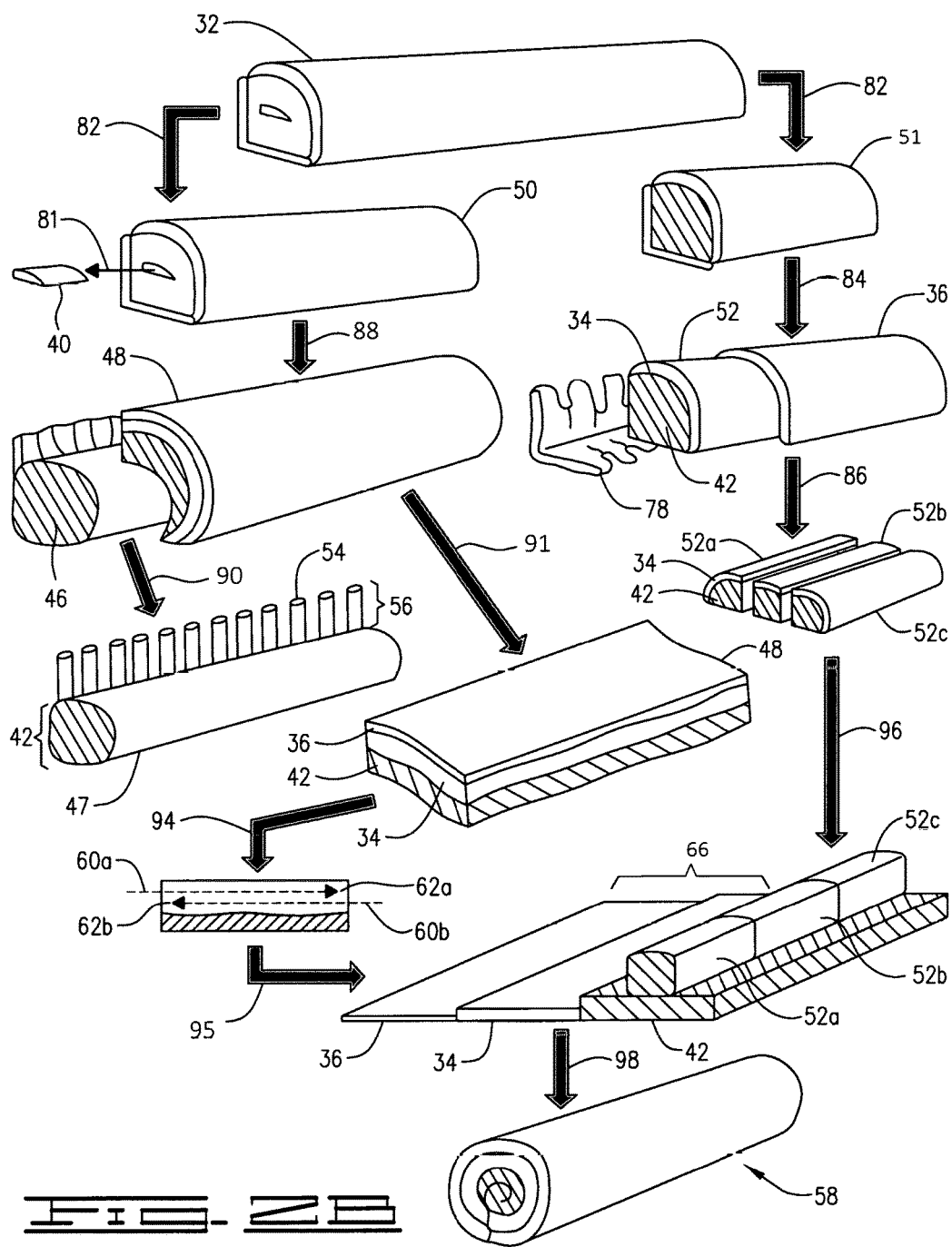
FIG. 2B is an example visual flow chart of FIG. 2A as applied to a pork carcass.
Figure 7:
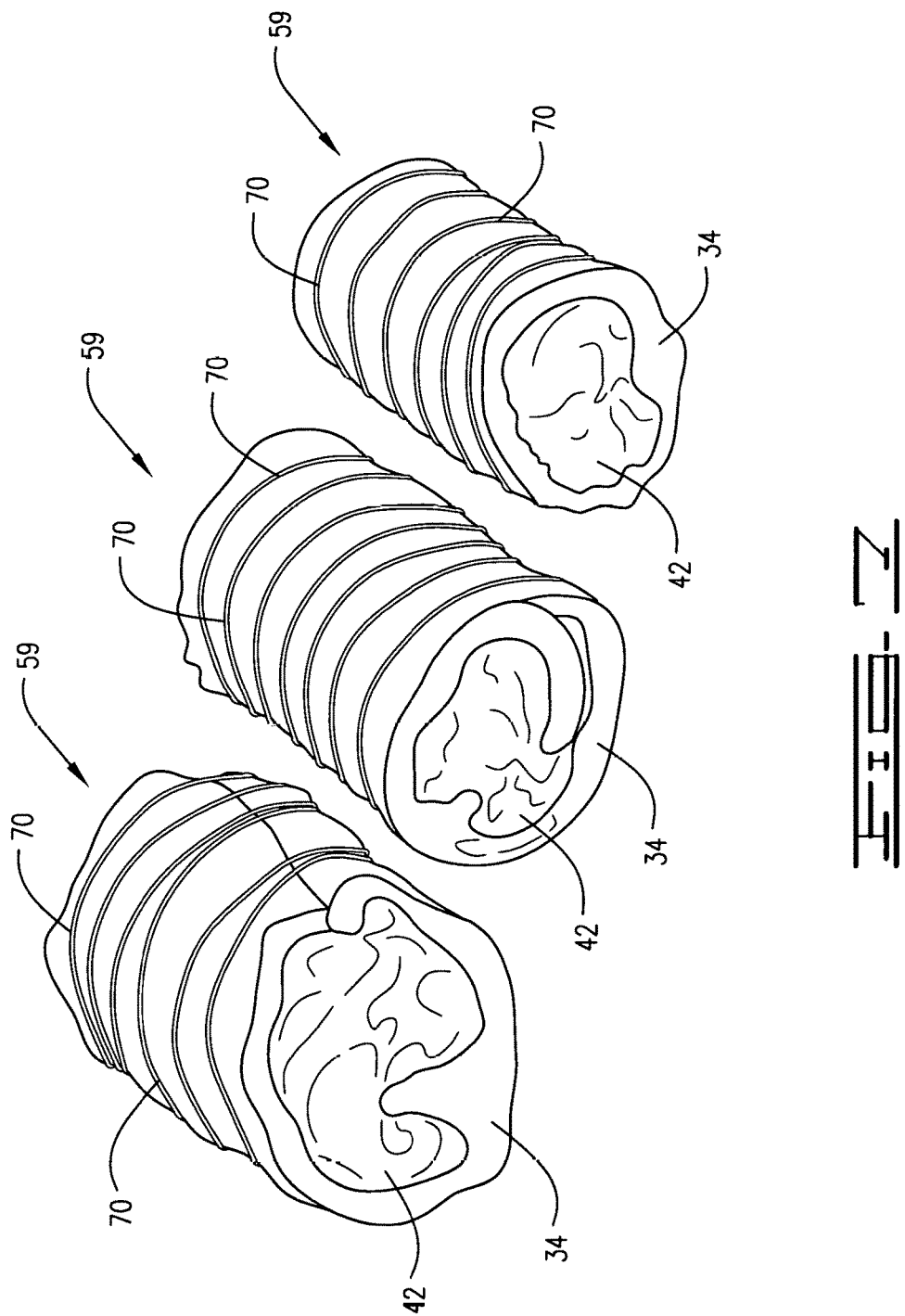
FIG. 7 depicts boneless meat products after undergoing one or more finishing steps of the method of FIGS. 2A and 2B.

FIG. 2A is an example flow chart for a method 31 of forming a bone-in meat product and a boneless meat product. The method depicted in FIG. 2A is species-independent; however optional steps are illustrated for embodiments where method 31 is applied to a specific species' carcass and are designated herein accordingly. FIG. 2B depicts a visual flow chart of FIG. 2A as applied to a pork carcass. FIGS. 3-5C illustrate various steps and techniques of method 31 as applied to a pork carcass. FIG. 7 depicts boneless meat products after undergoing one or more finishing steps of the method of FIGS. 2A and 2B.

Figure 8A:
FIG. 8A depicts a visual illustration of a modified method of FIGS. 2A and 2B to produce a boneless meat product made by using the sirloin portion of a pork loin and formed using a single piece of starting raw material.
Figure 8B:
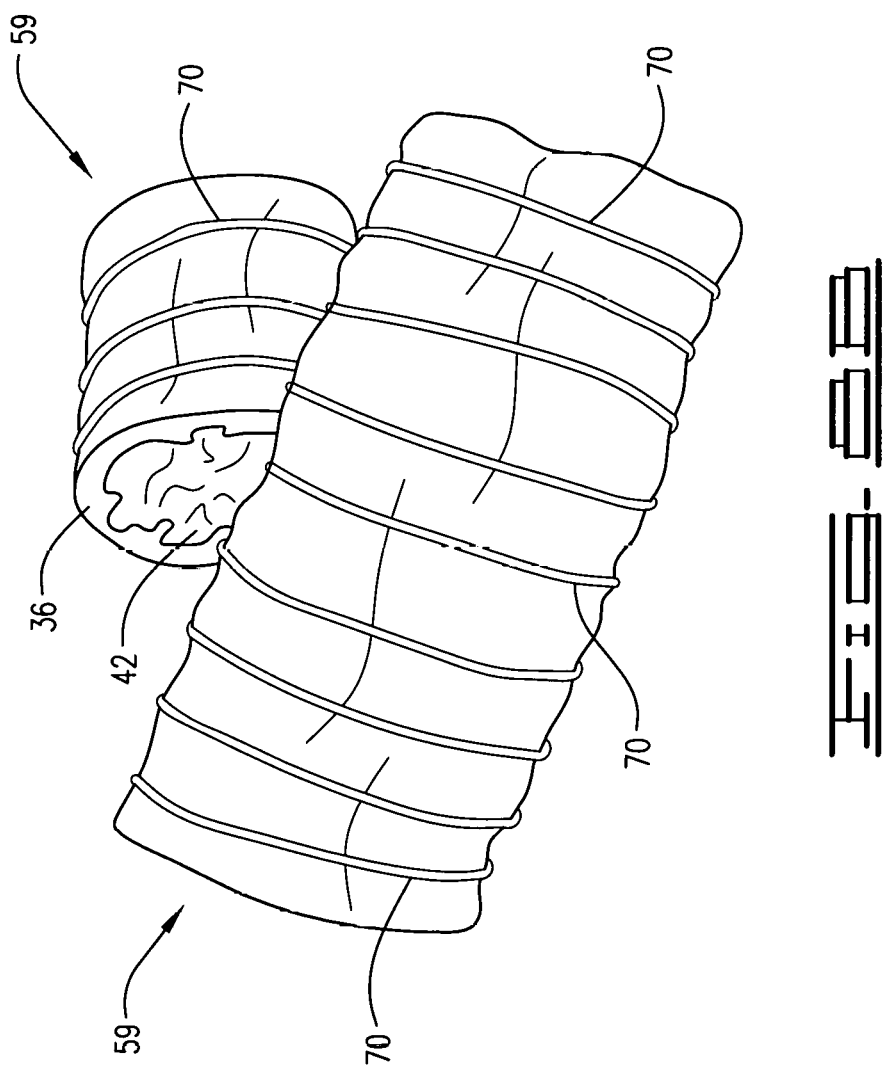
FIG. 8B depicts boneless meat products made with the material shown in FIG. 8A after undergoing one or more finishing steps of the modified method depicted in FIGS. 2A and 2B.

FIG. 8A depicts a visual illustration of a modified method of FIGS. 2A and 2B to produce a boneless meat product made by using a sirloin portion of a pork loin and formed using a single piece of starting raw material. FIG. 8B depicts boneless meat products made with the material shown in FIG. 8A after undergoing one or more finishing steps of the modified method depicted in FIGS. 2A and 2B.

Figure 10A:
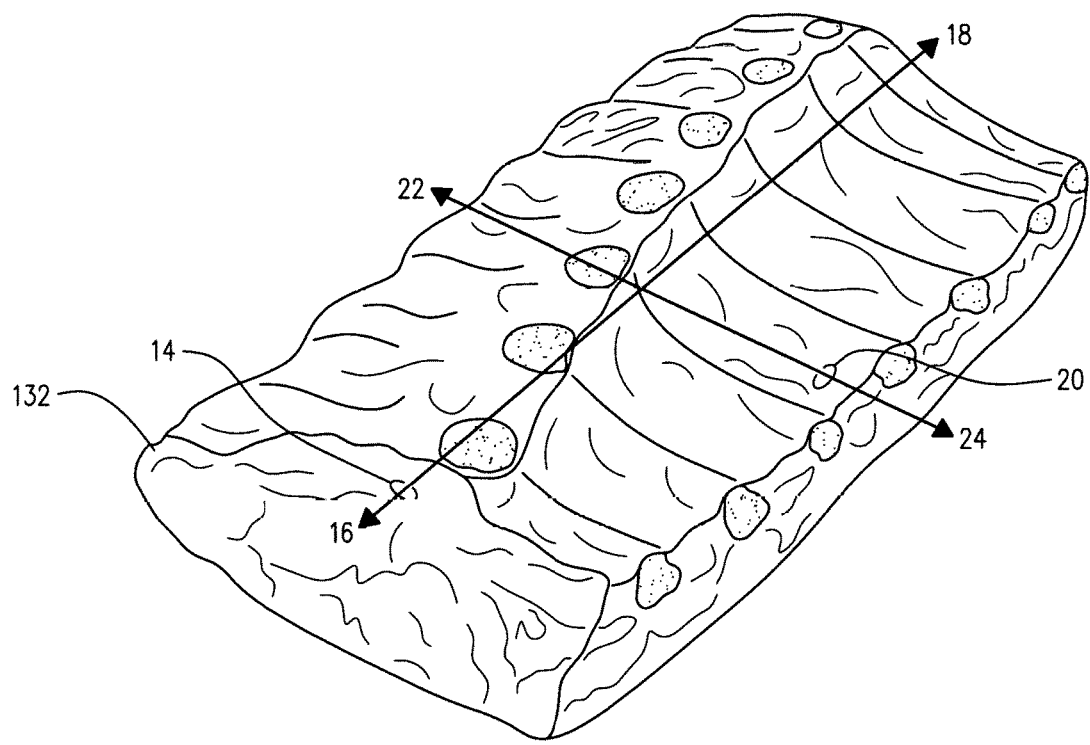
FIG. 10A is a visual example of starting material of the method depicted in FIG. 9 as applied to a beef carcass depicting a cavity-side view of a Beef Rib 109.

FIG. 9 depicts the presently disclosed method as applied to a beef carcass segment. For ease of reference for discussion purposes, those portions regarding the beef carcass use reference numerals that are one-hundred more than the presently disclosed species-independent method, e.g. method 31 (species-independent) and method 131 (method 31 as applied to a beef carcass), etc. FIGS. 10A-101 illustrate various steps and techniques of method 131 as applied to a beef carcass. Again for ease of reference, method 31 is described in connection with a pork carcass.

By way of illustration only and not to limit the present disclosure or claims, FIGS. 2A-8B will be discussed in reference to method 31 as applied to a pork carcass. Method 31 may optionally begin using an entire whole pork loin as the starting material 32, or with certain portions removed therefrom as described in this document. For example, as will be discussed in connection with the following paragraphs regarding the formation and use of meat filler pieces 52, starting material 32 depicted in FIG. 2B is a modified pork loin primal cut, for example, a pork loin with the following characteristics: a plurality of ribs, including an entire rack of ribs thereon, a lumbar bone segment 78, skin 36, cap on, fat back 34, loin meat member 42, and the sirloin and tenderloin both removed.

Figure 5A:
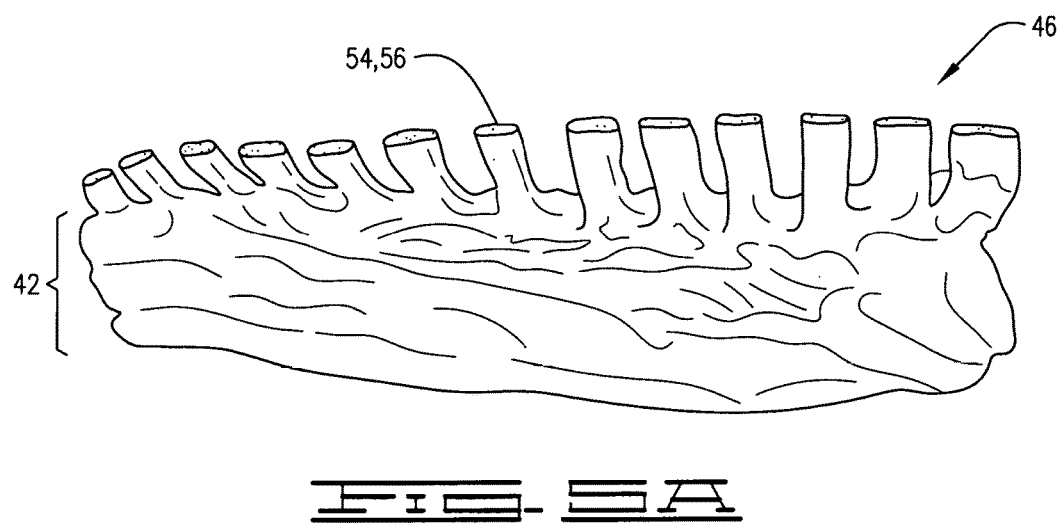
FIGS. 5A and 5B depict a visual illustration of a loin-side view and back-rib side view, respectively, of a bone-in meat portion resulting from the dividing step of FIGS. 4C-4F.
Figure 5B:
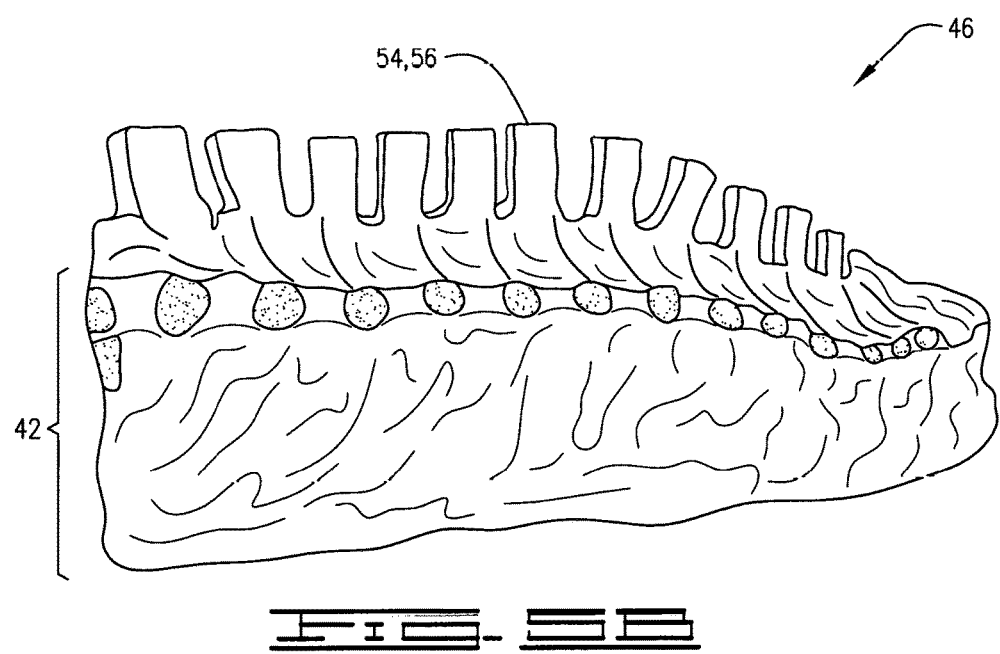
Figure 5C:
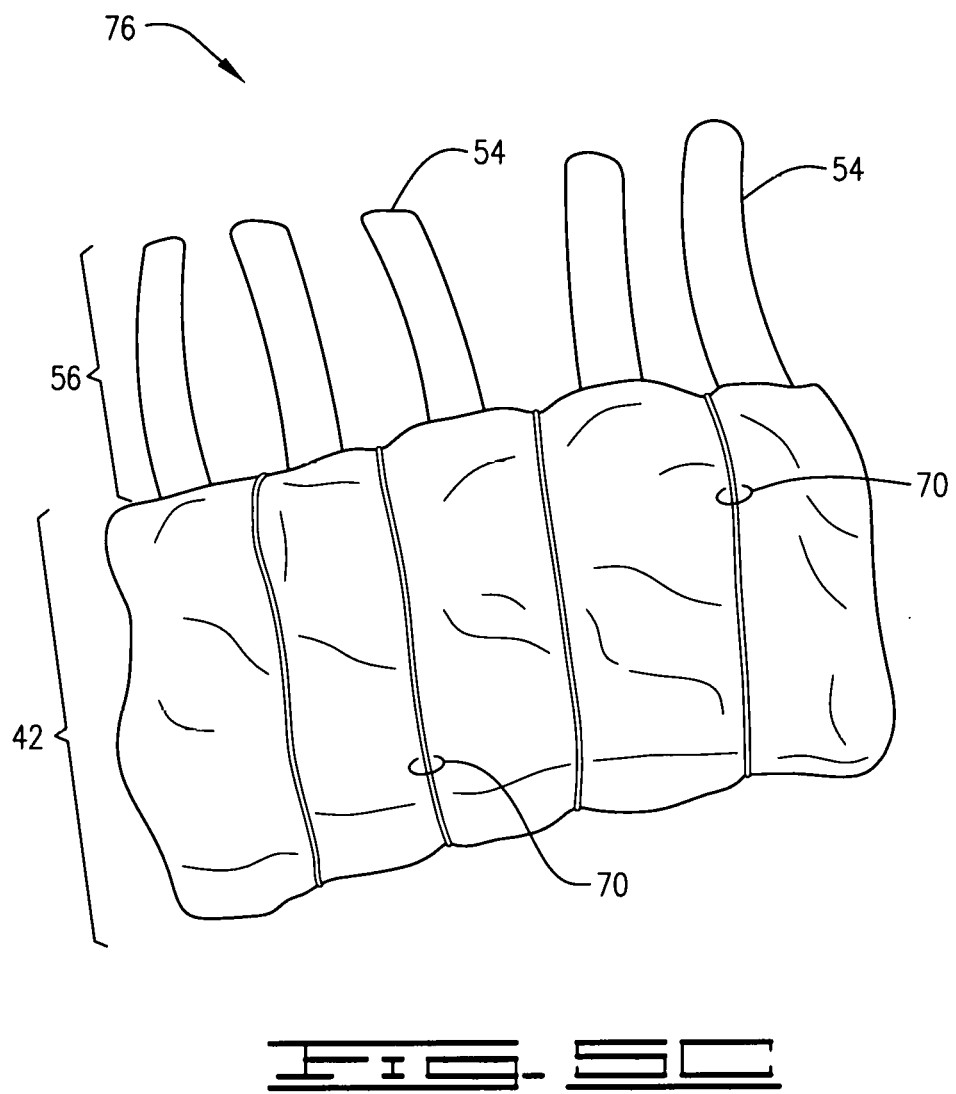
FIG. 5C depicts a bone-in meat product after undergoing one or more finishing steps of the method of FIGS. 2A and 2B.

Regardless whether boneless meat product 58 will include meat filler in the form of lumbar meat pieces 52, method 31 as applied to producing a bone-in meat portion 46 and bone-in meat product 47 from a pork carcass segment is not affected. Bone-in meat portion 46 produced by the described method 31 as applied to a pork carcass segment may be referenced herein as "a petite pork rack" as shown in FIGS. 2B, 5A, and 5B. The bone-in meat portion 46 may undergo further finishing processing steps 90, including cleaning of its rib bones 54 to produce a bone-in meat product 47 shown in FIG. 2B, and cutting down into a plurality of smaller bone-in meat products 76, one of which is depicted in FIG. 5C. The meat member 42 of bone-in meat portion 46 and bone-in meat product 47 is generally rounded and has the appearance of being generally cylindrically-shaped. Bone-in meat portion 46 is a bone-in loin having a smaller eye of loin compared to standard eye of loin sizes. Due to the increase size of swine, current eye of loin is approximately about 10 square inches to 12 square inches—almost double in size of eye of loin average sizes from approximately 30 year ago. The described methods and the products resulting therefrom yield a more historically correct meat product in terms of size. For example, as applied to a pork carcass, the resulting bone-in meat products 47 and 76 yield eating quality more akin to the classic pork chop that consumers are familiar with. From a chefs perspective, bone-in meat products 47 and 76 create a positive eye appeal through size and Frenched rib bone, moister eating experience, and fit the modern American consumer better by offering a smaller more health conscious portion that does not appear to be small in size.

Traditional porchetta pork roast is a boneless meat product that may be made a number of different ways. For example, traditional porchetta pork roast may be made using a whole hog boned out, stuffed, rolled and roasted, or having a pork side removed, but with the pork belly, loin, sirloin, and shoulder lean muscles attached and the ribs removed. The pork belly is trimmed to be able to wrap around the loin to form a log, e.g. a substantially cylindrically-shaped boneless meat product, which may further be cut into smaller boneless meat product pieces 59 as depicted in FIG. 8B. The boneless meat product 58 produced by the described method 31 as applied to a pork carcass segment may be referenced herein as a "petite pork porchetta" and is depicted in FIG. 2B. As will be further described herein, boneless meat product 58 may undergo further finishing steps 100 (as will be further described herein), which may include cutting boneless meat product 58 to produce a plurality of smaller boneless meat product pieces 59 that are also generally cylindrically-shaped, and are depicted in FIG. 7. The boneless meat product 58 comprises a portion of the loin with the back fat, and optionally skin, rolled or wrapped around the loin meat 42 such that boneless meat product 58 (without any filler meat pieces 52) is all formed from a single continuous portion of meat 42 and fat 34, and optionally skin 36.

Figure 3:
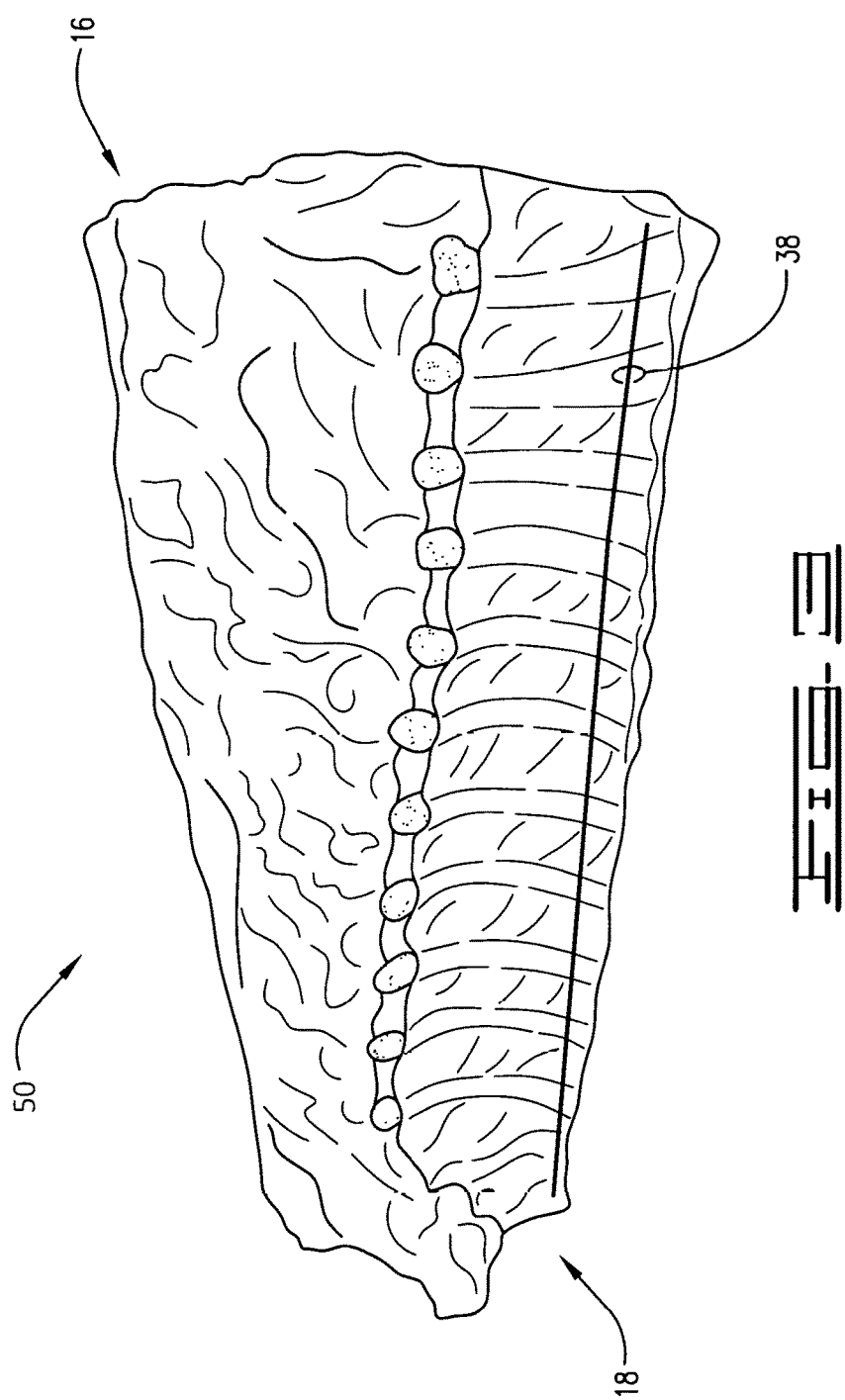
FIG. 3 is a visual example of starting material of the method depicted in FIGS. 2A and 2B as applied to a pork carcass depicting a cavity-side view of a bone-in loin.

Any processing techniques known in the art to arrive at the meat cut of the starting carcass segment may be used. For example, the described methods and techniques do not alter or change the current manner in which fabricators separate the pork carcass at the loin/shoulder primal separation point and the ham/loin primal separation point. The sirloin may be maintained and kept attached or may be optionally removed, including any bones therein. Optionally, to obtain a generally consistent or equal length in ribs, to the extent it is desirable, the separation of the belly/sparerib from the bone-in loin may be modified as depicted in FIG. 3 illustrating the modified scribe line 38. Any exposed rib bones 54, as will be discussed later in this disclosure, may also be trimmed and cut individually to a desired length and appearance.

As applied to a pork loin carcass segment, regardless of whether meat filler pieces 52 are to be utilized, and in reference to FIGS. 2A, 2B, and 3, method 31 includes dividing step 88. Prior to dividing step 88, other processing or make-ready steps may be done on carcass segment 50. For example, FIG. 3 depicts a cavity-side view of a bone-in pork loin 50 with a modified scribe line 38 (as discussed previously). As shown in this example, carcass segment 50 depicts a bone-in pork loin with fat 34 and skin 36 attached thereto. Carcass segment 50 has a length defined between an anterior end 16 and a posterior end 18.

In current fabrication processes, the width of the traditional back rib is approximately 3.5 inches and the width of traditional sparerib is approximately 5.5 inches. As shown toward the right-side portion, i.e., anterior end 16, of FIG. 3, the first rib, i.e., the most anterior rib, may be approximately 2.5 inches measuring from the chine edge to the modified scribe-line 38 and the rib at the $9^{th}$ and $10^{th}$ rib interval may be approximately 3.5 inches in length due to the curvature of the backbone. In the traditional scribe-line fabrication the corresponding measurements are about 2 inches on the first rib (most anterior rib) and about 4 inches on the $9^{th}$ and $10^{th}$ rib interval.

Figure 4A:
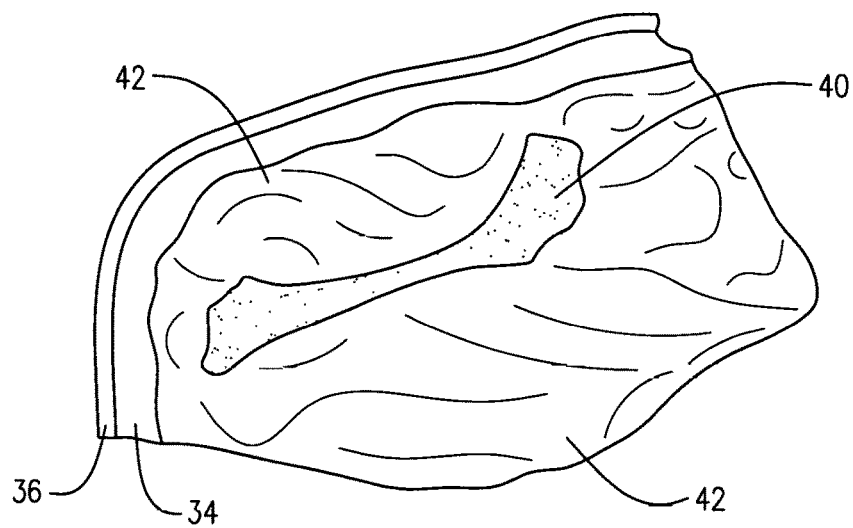
FIG. 4A is a visual illustration of the bone-in loin of FIG. 3 depicting a shoulder-end view showing the scapula bone remaining in the meat portion of the bone-in loin with back fat and skin attached.
Figure 4B:
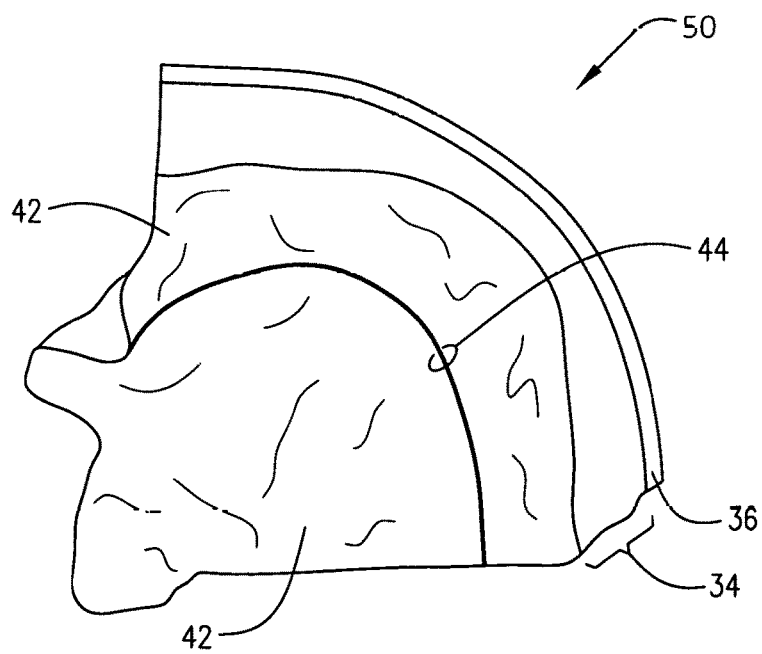
FIG. 4B is a visual illustration of the bone-in loin of FIG. 3 depicting a ham-end view and a score serving as a guiding cut line within the loin meat portion.
Figure 4C:
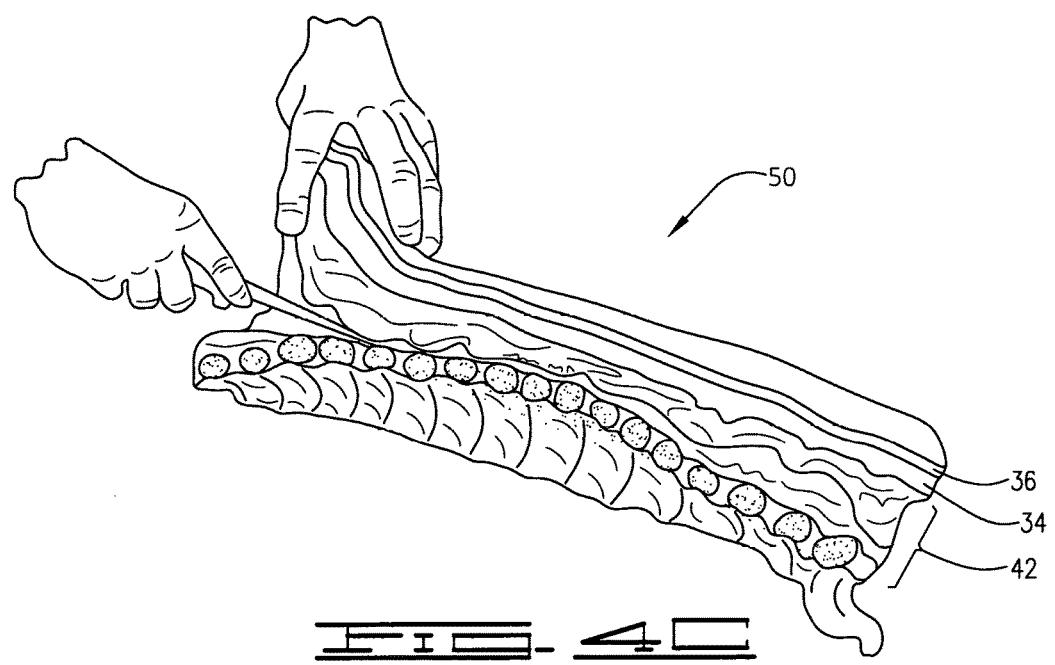
Figure 4D:
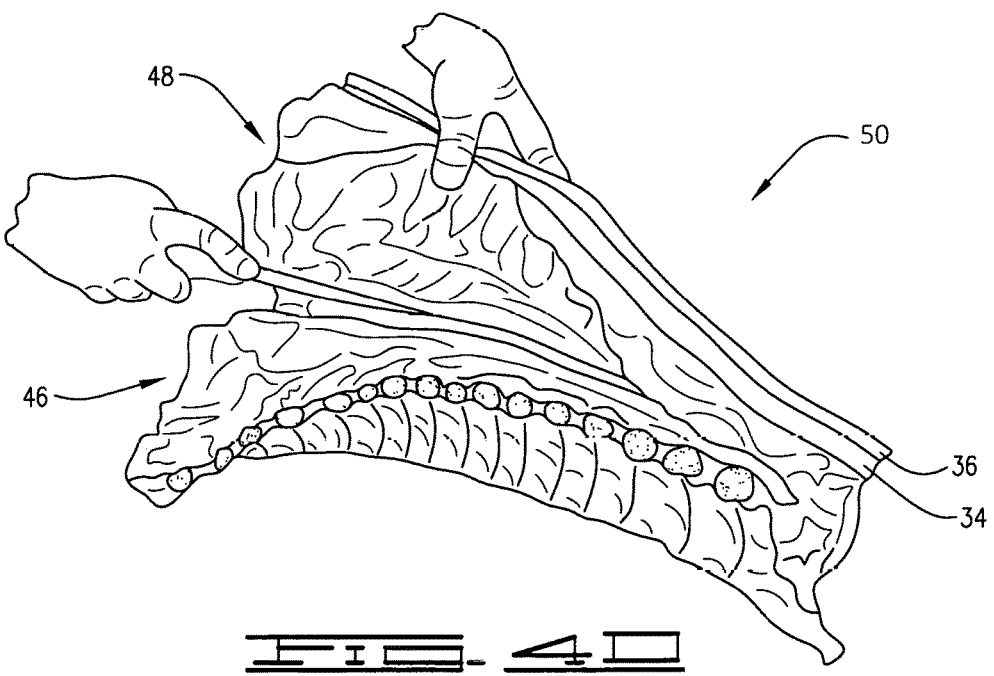

FIG. 4A depicts an anterior end 16 view of FIG. 3 showing a portion of the scapula bone 40 remaining in the loin meat portion 42 of carcass material 50 of the bone-in loin with back fat 34 and skin 36 attached. For example, carcass material 50 may weigh approximately 8 to approximately 9 pounds. To avoid damaging the back fat 34 and skin cap 36, the remaining portion of the shoulder blade bone 40 is removed as designated with reference numeral 81 in FIG. 2B. The removal of shoulder blade bone 40 may be achieved via knifing out or any other manner that does not damage the back fat 34 and skin cap 36. FIG. 4B depicts a posterior end view 18 of starting material 50 having a semi-circular guide cut 44 within the loin meat portion 42 at the posterior end 18 to provide a guide representing a desired resulting size of the chop portion (or loin meat member 42) of the bone-in meat portion 46, i.e., inner region of the semi-circle, and leaving a sufficient thickness of lean meat 42 adjacent to and attached to the fat 34 in order for the boneless meat product to have a consistent appearance, i.e. the outer region of the semi-circle.

For example, in connection with pork products, the desired resulting size of the loin muscle portion 42 of the bone-in meat portion 46 may be approximately from about 2.5 inches to about 3.5 inches in diameter. The desired resulting size of the loin muscle portion/meat member 42 for the boneless meat portion 48 is a thickness sufficient of lean meat 42, e.g. approximately 1 inch left adjacent to the attached fat 34, as measured between a ventral side and dorsal side, e.g. toward the fat 34, when the boneless meat portion 48 is laid substantially flat as shown in FIG. 2B between the arrows labeled as 91 and 94. The fat 34 may also be about at least approximately one inch thick as well. The resulting boneless meat product 58 may have an approximate total diameter of about at least 4 inches when the boneless meat portion 48 is in its rolled state and no meat filler pieces 52 are used. Meat filler pieces 52 may collectively add approximately 2 pounds to 3 pounds to the total weight of boneless meat product 58.

The actual size of the loin meat member portion 42 for each of the bone-in meat portion 46 and the boneless meat portion 48 produced by the presently described method 31 may vary depending upon the size of the carcass and/or the aesthetic appearance to obtain the desired consistency in the resulting finished products. For example, boneless meat product 58, e.g. petite pork porchetta, may have a total diameter (in its rolled state) of about 4 inches or more to in diameter when no meat filler pieces 52 are utilized, with approximately up to 10% of the total diameter being fat 34 covering to protect the loin meat portion 42, e.g. roast, in envelops. For example, boneless meat product 58 may have a total diameter (in its rolled state) of greater than 4 inches, including about 8 inches or more when meat filler pieces 52 are utilized. For example, when the bone-in meat portion 46, e.g. petite pork rack, is separated into individual chops, it may have the appearance of a short-boned lamb chop.

Following the aforementioned pre-processing steps, as applied to the pork carcass segment 50 depicted in FIG. 3, method 31 includes dividing step 88 that divides pork carcass segment 50 along its length to thereby form a boneless meat portion 48 and a bone-in meat portion 46. FIGS. 4C-4F depict dividing step 88. Dividing step 88 is generally done along the guide cut or scribe line 44 depicted in FIGS. 4B and 4E, which follows the general curvature of the carcass segment.

Bone-in meat portion 46 may have at least three rib bones 54 and has a length defined between an anterior end 16 and a posterior end 18 of bone-in meat portion 46. As shown in FIGS. 2B, 5A, and 5B, bone-in meat portion 46 includes a generally rounded meat member 42 attached to one end of each of the rib bones 54. This generally rounded meat member 42 is composed of loin meat and spans the length of bone-in meat portion 46. For example, the generally rounded meat member 42 may have a diameter of about at least 2.5 inches.

FIGS. 5A and 5B depict an exterior-side view and cavity-side view, respectively, of the resulting bone-in meat portion 46 from dividing step 88. Rib bones 54 have a portion 56 exposed that has some remaining meat, including intercostal muscles remaining on the rib bones 54.

Bone-in meat portion 46 may undergo further processing steps, including a finishing step 90. Finishing steps 90 may be accomplished by any techniques and devices known in the art. Finishing step 90 may include exposing a length of each rib bone 54 from the exposed tip (or the proximal end) of the rib bone 54 down to and not including the loin muscle 42 present on the second end of rib bone 54 to clean the rib bones 54 and thereby produce a bone-in meat product 47 as shown in FIG. 2B.

The exposing step may be done by cleaning the rib bone around its periphery to remove any remaining muscle, meat, or other materials that was not removed when a portion 56 of each rib bone was exposed. For example, in the presently described method 31, the intercostal muscles meat present on and between the exposed ribs 56 is removed up to and without cutting into the loin meat attached to the second end of the rib bone. For example, depending on the size of the carcass and the applicable rib bones, such ribs may be cleaned from about 1 inch on the tapered end and about 1.5 inches to about 2 inches on the posterior rib bones 54, adjacent the center of the loin, e.g. meat member 46, as depicted in FIGS. 5A and 5B.

For example, non-limiting exemplary finishing steps 90 are depicted in box 92 of FIG. 2A. Finishing steps 92 may also include securing bone-in meat portion 46 to maintain its shape and form, cleaning, polishing, seasoning, cutting into a plurality of smaller bone-in meat product pieces 59, cooking, etc., and any combinations thereof.

For example, cleaning the exposed bone and polishing the bone for aesthetically pleasing presentation may be achieved via water jets and/or any other cleaning and polishing process known in the art. The membrane of the bones may optionally be left on or removed.

Bone-in meat portion 46 may undergo further finishing steps 90, including cutting between one or more exposed rib bones to form a plurality of bone-in meat products 76. For example, the plurality of bone-in meat products may include any number of rib bone petite pork racks, e.g. a 5-bone petite pork rack as shown in FIG. 5C, a 4-bone petite pork rack, a 3-bone petite pork rack, a 2-bone petite pork rack, individual single-bone petite pork chops, and any combinations thereof. The bone-in meat portion 46, bone-in meat product 47, and the plurality of smaller bone-in meat products 76 may be optionally seasoned, breaded, cooked, etc. For example, a bone-in meat product 47 may be divided in to three petite pork racks to form a plurality of smaller bone-in meat products 76, each having about 4-5 rib bones and weighing about 4.5-5 pounds, depending upon the size and weight of the pork carcass segment.

As part of one or more of finishing step 90, bone-in meat portion 46, bone-in meat product 47, and the plurality of smaller bone-in meat products 76 may be secured. Securing may be done by tying, including the use of manual tying, automated tying, clipping via plastic heat proof clips or rings, e.g. metal rings, or other securing devices, including, without limitation, netting, trusses, strings 70, 170, bags, or other any other securing methods and devices known in the art, or combinations of any of the foregoing.

With reference to FIGS. 2A and 2B as applied to the pork carcass segment 50 depicted in FIG. 3, dividing step 88 also produces boneless meat portion 48 as shown in FIG. 2B. Boneless meat portion 48 has a length defined between an anterior end 16 and a posterior end 18 of boneless meat portion 48. Boneless meat portion 48 includes a portion of meat member 42 from the carcass segment, where such portion of meat member 42 has a thickness of about 1 inch as measured between a ventral side and a dorsal side of boneless meat portion 48. Boneless meat portion 48 includes a fat member 34 attached to the meat member 42, and may optionally include skin 34 attached to fat member 34, as shown in FIG. 2B.

Boneless meat portion 48 is positioned in a substantially flat configuration as shown in FIG. 2B designated by the arrow labeled with reference number 91.

Method 31 includes the step of forming boneless meat portion 48 into a generally cylindrically-shaped meat portion along the length of boneless meat portion 48 to thereby form boneless meat product 58.

The forming step includes step 94 of forming an extension flap 66 from boneless meat portion 48. Depending upon what materials are present on boneless meat portion 48, extension flap 66 may be comprised of fat 34, skin 36, or fat 34 and skin 36.

Step 94 of forming flap 66 will be described in reference to FIGS. 6A-6C. FIG. 6A depicts a boneless meat portion 48 separated from the carcass segment as a result of dividing step 88 having a meat member 42 and a fat member 34 with the skin removed. For example, fat member 34 in a pig carcass may have a thickness of about 2 inches, as measured between the ventral end and dorsal end of boneless meat portion 48.

As shown in FIG. 6B, flap 66 is created by partially dividing fat member 34 across a width of boneless meat portion 48 to a fixed point 62 near an end distal from a starting end where the dividing step starts, as indicated by the dotted line 60. As shown in FIG. 6B, a portion of the fat, designated with reference numeral 64 in FIG. 6C is proximate in location to and attached with the meat member 42 of boneless meat portion 48. The attached fat portion 64 may also be referred to as a stationary portion 64.

The partial dividing step depicted in FIG. 6C is depicted as starting from the left side of the substantially flat boneless meat portion 48 and ends near the right end; such depiction is for illustrative purposes only and should not limit the present disclosure, as extension flap 66 may be created by starting from the right side of boneless meat portion 48, traversing across its width, and terminating at a distal point near the left side.

FIGS. 6A-6B depict a single extension flap 66 formed of fat member 34. Skin 36 may be attached to and on top of flap 66 (not depicted).

In another example, as depicted in FIG. 2B, fat member 34 and skin 36 may both be partially divided to form extension flap 66. For example, as shown in FIG. 2B, extension flap 66 may be formed by partially dividing skin 36 across the width of boneless meat portion 48 from a starting end and to a fixed point 62a distal from the starting end indicated by dashed line 60a. Skin 36 is divided to keep it as thin as possible while still maintaining the integrity of the skin portion forming flap 66. As shown in FIG. 2B, fat member 34 is partially divided in the same manner as previously described but is done in a direction opposite that which skin 36 was partially divided, see e.g. reference numerals 60b and 62b. Stated another way, flap 66 may be formed by dividing skin 36 and fat 34 in a serpentine manner, e.g. the knife cuts may start from opposite ends of the area of interest but not cut completely through and thus thereby be maintained as a single piece, and as further described below in reference to step 86.

FIG. 2B depicts an arrow labeled as 95 showing a simplified view of boneless meat portion 48 with flap 66 comprised of skin 36 and fat 34 in an expanded and substantially flat configuration. Note that FIG. 2B depicts a simplified visual illustration of flap 66 as a portion of skin 36 remains attached to fat 34, e.g. a stationary portion of skin remaining attached to fat, and likewise a portion of fat 34 remains attached to meat member 42, e.g. stationary portion 64, as depicted in FIG. 6C in order to keep flap 66 attached to and form a continuous piece of material.

Forming boneless meat product 58 includes the step 98 of wrapping or enveloping meat member 42 with flap 66 in the direction shown by reference numeral 68 in FIG. 6C and rolling boneless meat portion 48 tightly into a generally cylindrically-shaped meat portion along its length to produce boneless meat product 58 as depicted in FIG. 2B. A cross-sectional view of boneless meat product 58 is depicted in FIG. 6D.

Once formed into the generally cylindrical shape and thereby forming the boneless meat product 58, the boneless meat product 58 may optionally undergo one or more finishing steps 100. For example, non-limiting exemplary finishing steps are depicted in box 102 of FIG. 2A. Finishing steps 100 may include securing boneless meat product 58 to maintain its shape and form, cleaning, seasoning, cutting into a plurality of smaller boneless meat product pieces 59, cooking, etc. FIG. 7 depicts a plurality of smaller boneless meat product pieces 59 in a secured form. Securing may be done by tying, including the use of manual tying, automated tying, clipping via plastic heat proof clips or rings, e.g. metal rings, or other securing devices, including, without limitation, netting, trusses, strings 70, 170, bags, or any other securing methods and devices known in the art, or combinations of any of the foregoing. Optionally, and not depicted in the figures, prior to step 98 of forming boneless meat product 58, the boneless meat portion 48 may be seasoned. For example, fat 34 and/or skin 36 may also optionally be scored, e.g. a diamond cross-cut and the like, to provide an aesthetically pleasing appearance and in connection with rendering of boneless meat product 58 or plurality of smaller boneless meat products 59. For example, boneless meat product 58 and plurality of smaller boneless meat products 59 may also be injected or seasoned prior to any optional cooking finishing step 102. Cooking may include any cooking method known in the art, including sous vide method, and/or roasting.

For example, in connection with the example pork carcass segment 50, the total weight for the entire boneless meat product 58 may be approximately 8 pounds to about 9 pounds depending on the weight of the carcass, when meat filler pieces 52 (as will be described later in this disclosure) are not utilized. As previously mentioned, meat filler pieces 52 may collectively add approximately 2 pounds to 3 pounds to the total weight of boneless meat product 58. For example, boneless meat product 58 (without meat filler pieces 52), e.g. petite porchetta, may have a total diameter (in its rolled or wrapped state) from about 4 inches to about 8 inches, with approximately up to 10% of the total diameter being fat covering to protect the meat portion 42, e.g. roast, it envelops. For example, the resulting rolled boneless meat product 58 may have a fat thickness of approximately 0.25 inches to about 0.375 inches depending on the total diameter of the boneless meat product 58.

Stated another way, the disclosed method 31 produces a boneless meat product 58 that is substantially cylindrically-shaped comprising a meat portion 42 wrapped in and surrounded by a continuous layer of fat 34. Meat portion 42 has a thickness as measured between a ventral side and a dorsal side of meat portion 42. The continuous layer of fat is formed by splitting a fat member 34 attached with the meat portion 42 into a flap portion 66 and a stationary portion of fat 64 with the stationary portion of fat 64 remaining attached to meat portion 42. Fat member 34 has a thickness defined between a ventral side and a dorsal side of fat member 34, and the thickness of fat member 34 is greater than the thickness of meat portion 42. For example, flap portion 64 is in contact with an exposed surface of meat portion 42, as depicted in FIG. 6D.

For example, as described in the present disclosure, boneless meat product 58 is formed of a single continuous portion of meat 42 and fat 34 and/or skin 36.

Method 31 may also optionally include meat filler segments or pieces 52 within boneless meat product 58. The prior discussion of forming a bone-in meat portion 46 remains unchanged and the method of forming a boneless meat portion 58 remains substantially unchanged except as described herein in connection with the meat filler pieces 52. The right side of FIGS. 2A and 2B depicts the optional and additional steps when meat filler pieces 52 are included.

For example, as applied to a pork carcass in discussion with method 31, the starting carcass segment of method 31 is a bone-in carcass segment having at least three rib bones. The starting bone-in carcass segment may be a primal cut of pork loin 32 which, for example, may have undergone prior processing such that the belly, sirloin, and tenderloin have been removed and loin 32 has at least three rib bones, skin, fat, and a lumbar bone segment attached thereto. The weight of such loin 32 for purposes of this example may be around 15 pounds or more.

As shown in FIGS. 2A and 2B, prior to dividing step 88 as previously discussed, the bone-in carcass segment, e.g. loin 32, undergoes dividing step 82 which splits loin 32 into a first piece 50 and a second piece 52. Dividing step 82 is done across the width of starting bone-in carcass segment 32 as shown in FIG. 2B. First piece 50 corresponds to the starting carcass segment previously discussed, and includes at least three rib bones. Second piece 51 corresponds to a lumbar segment, which includes a lumbar bone segment 78, meat member 42 corresponding to the applicable muscles that make up the loin, fat 34, and skin 36. Optionally, and not depicted in FIG. 2B, dividing step 82 may be done in such a way that keeps skin 36 that would correspond to second piece 51 attached to first piece 50 on first piece's 50 posterior end. For example, as a result of the described modified dividing step 82, the resulting second piece 51 would correspond to a lumbar segment, which includes a lumbar bone segment 78, meat member 42 corresponding to the applicable muscles that make up the loin for that cut, and fat 34.

To make the meat filler pieces 52, method 31 includes step 84 to remove lumbar bone segment 78 and, optionally includes removing skin 36, and thereby form a modified second piece 52, e.g. a boneless and skinless lumbar meat roast segment 52 as shown in FIG. 2B. Lumbar bone segment 78 may include a plurality of vertebrae. For example, in the present discussion as applied to a pork carcass, modified second piece 52 may weigh about 2 to about 3 pounds.

Method 31 further includes step 86 of dividing modified second piece 52 in the same direction of its length as defined between an anterior end and posterior end of modified second piece 52 into at least two smaller boneless and, optionally, substantially de-skinned meat pieces. For example, to form meat filler pieces 52 as depicted in FIG. 2B, the second piece 52 may be cut in a serpentine manner, e.g. the knife cuts may start from opposite ends of the meat piece but not cut completely through between the anterior end and posterior end and thus thereby be maintained as a single piece (not depicted) and not a plurality of individual pieces but a single connected piece with segments. As shown in FIG. 2B, step 86 is depicted as dividing modified second piece 52 into three smaller boneless pieces 52a, 52b, and 52c. Other ways to divide modified second piece 52 may include cutting across its width, including in a serpentine manner, or cutting completely across its width to form a plurality of smaller boneless filler pieces.

As shown by step 96 in FIGS. 2A and 2B, the smaller boneless filler pieces 52a, 52b, and 52c may be placed in the same direction of the length of meat member 42 of boneless meat portion 48 in a substantially flat configuration as illustrated in FIG. 2B. Boneless filler pieces 52a, 52b, and 52c may be placed skin-side or fat-side (depending on whether skin remains attached), onto meat member 42. For example, if modified filler piece 52 was cut in a serpentine manner to form a single piece that has boneless piece segments 52a, 52b, and 52c, such pieces can be positioned arranged in the configuration shown in FIG. 2B over the length of meat member 42. If the boneless filler pieces 52a, 52b, and 52c are not long enough to cover the length of meat member 42, such pieces may be stretched or otherwise manipulated to cover the length of meat member 42 to achieve the configuration shown in FIG. 2B. Method 31 proceeds as previously described in connection with step 98 of wrapping and rolling to form boneless meat product 58. When filler pieces 52 are used, step 98 includes enveloping filler pieces with boneless meat portion 48. Similarly, method 31 may proceed with finishing step 100 as previously described.

For example, with reference to FIGS. 8A and 8B another boneless meat product formed using a single piece of starting carcass segment may be made using a sirloin portion of a pork carcass, and may be referred to as a "petite sirloin porchetta." The method of forming the boneless meat product having the sirloin in the middle is similar to presently described method 31 described above where the step of acquiring a boneless meat portion 48 and step 94 of forming an extension flap are modified.

For example, a method of forming a boneless meat product from a sirloin sub-primal of a pork carcass segment is disclosed. The pork carcass segment includes an export belly 74, a sirloin meat portion 72, and skin 36 attached to the pork carcass segment. The modified method 31 comprises the steps of forming a flap of skin of the export belly 74 by dividing a meat portion of the export belly from skin 36 attached to export belly 74 and thereby removing the meat portion of the export belly from the carcass segment while leaving substantially intact the skin portion 36 of the export belly 74 attached to the skin of the sirloin meat portion 72. Stated another way, the export belly 74 may be filleted off while leaving skin 36 in the form of a flap attached to sirloin portion 72 as depicted in FIG. 8A. The modified method includes a modified wrapping step 98 in order to form a boneless meat product by wrapping the skin flap substantially around the sirloin meat portion 72 and the associated skin portion that is contiguous with and attached to sirloin meat portion 72 to produce a boneless meat product that is generally cylindrically-shaped.

As previously discussed in connection with finishing step 100, the resulting sirloin boneless meat product may likewise undergo the same finishing steps, including cutting the sirloin boneless meat product into a plurality of smaller boneless meat products 59 as shown in FIG. 8B. Once formed into the generally cylindrical shape, the boneless meat portion may be secured to maintain its shape as shown in FIG. 8B. Finishing step 100 was previously discussed above in connection with the boneless meat portion as applied to the carcass segment 50 depicted in FIG. 3 and for brevity, is incorporated here in its entirety, as it is equally applicable here, and will not be repeated.

As previously described, the modified method 31 is capable of producing a boneless pork sirloin meat product that is substantially cylindrically-shaped comprising a boneless meat portion 72 wrapped in and surrounded by a continuous layer of skin 36, wherein the continuous layer of skin includes skin attached to a portion of the meat portion 72 and a skin flap formed by removing a belly portion 74 from a sirloin portion without removing skin attached to the belly portion thereby forming the skin flap portion of the continuous layer of skin 36.

Referring to FIGS. 9 and 10A-10I, FIG. 9 depicts the presently disclosed method 31 as applied to a beef carcass segment (herein referred to a method 131) to produce a bone-in meat portion 146 and a boneless meat product 158. The starting material for the beef carcass segment has at least three rib bones 154. For example, the starting material 132 may be referred to in the industry as the 109 Rib or Roast Rib 109, or meat identification number IMPS/NAMP 109 of the IMPS/NAMP classification system in North America, where IMPS means the United States Department of Agriculture's approved Institutional Meat Purchase Specifications for fresh beef, pork, and lamb; and NAMP means the North American Meat Processors Association. Such starting material 132 may include seven rib bones 154, and beef carcass segment 132 may weigh at least 20 pounds. Muscles present within 109 Rib include the longissimus dorsi, multifidus dorsi, quadratus lumborum, serratus dorsalis, trapezius, spinalis dorsi, and the intercostales externi and intercostales interni (collectively, the intercostals or intercostal muscles).

Due to the variations in sizes and anatomy between animal carcasses, e.g. beef and pork, method 131 may include additional or different steps than those applied to a pork carcass segment, and thus are described here in connection with FIGS. 9 and 10A-10I.

FIG. 10A depicts starting beef carcass segment 132. FIG. 10A is a cavity-side view of Beef Rib 109 and the corresponding general points of reference pertaining to anatomical axes for quadrupeds as previously described in reference to FIG. 1C are superimposed over carcass segment 132.

Figure 10B:
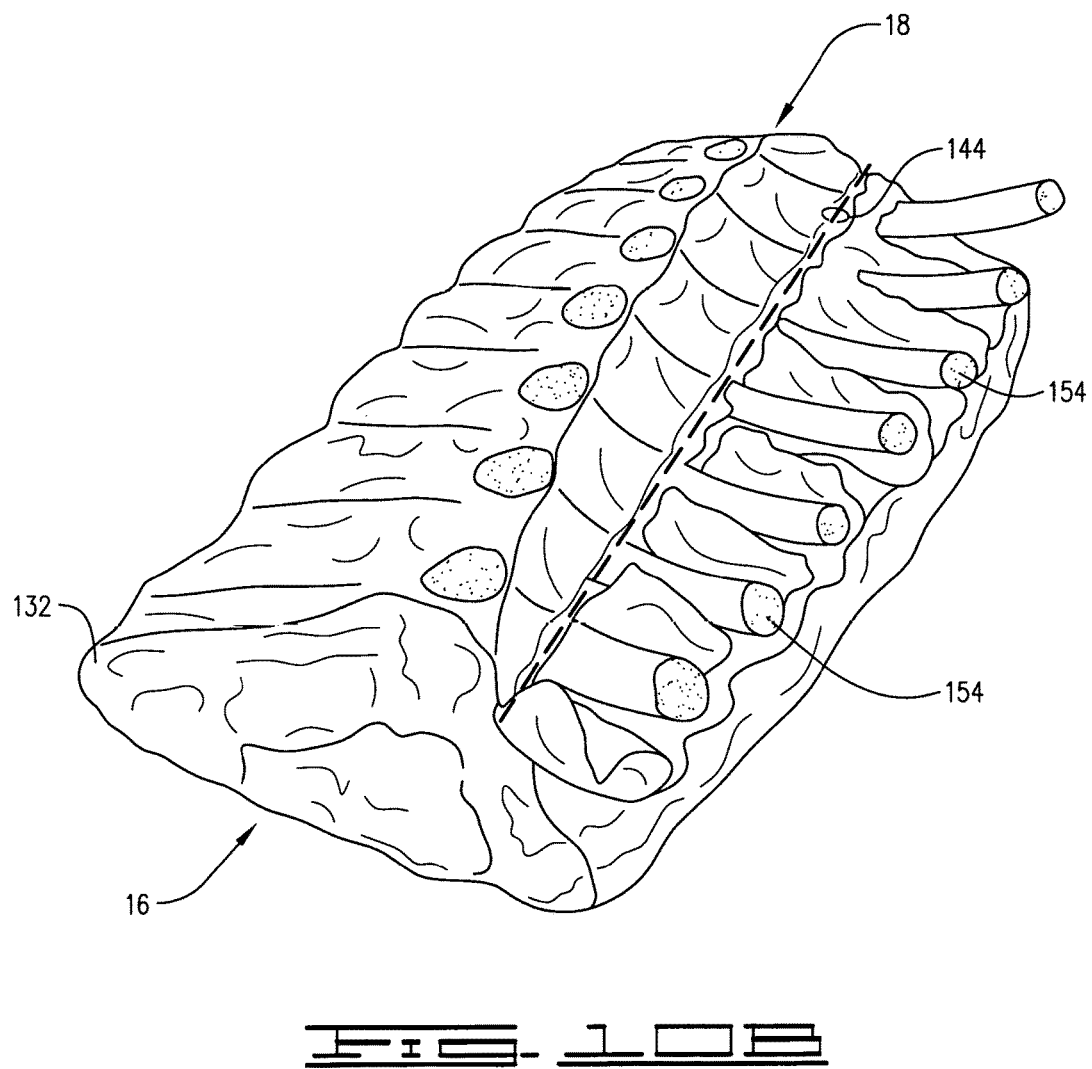
FIG. 10B depicts a visual example of a step of freeing the rib bones of the carcass depicted in FIG. 10A.

Unlike method 31 as applied to a pork carcass segment, method 131 includes step 187 before dividing step 188 (corresponding to dividing step 88) as shown in FIG. 9. Step 187 includes freeing rib bones 154 or exposing a portion of each of rib bones 154 by removing muscle and other material present around a periphery of each of the rib bones 154 up to a fixed point along a length of each of the rib bones 154 as measured from a ventral side 24 toward a dorsal side 22 of each rib bone 154. For example, the fixed point may be the meat member present on the dorsal side 22 of each rib bone (similar to that as applied to the pork carcass segment). For example, a non-limiting example to describe the location of the fixed point on each rib bone 154 may be as follows. The length of rib bone 154 exposed may be measured from ventral rib tip to its dorsal root. For example, this may correspond to about 3.5 inches on the posterior end 18 (or loin-end if referring to primal reference points), and about 2 inches on the anterior end 16 (or chuck end of beef carcass segment 132). The difference in length on each end corresponds to the natural curvature of the carcass segment 132 in an effort to maintain a generally consistent diameter for the muscle attached to dorsal end of each rib and for an aesthetically pleasing appearance of having the exposed rib bones 154 appear consistent in length. Guide cut 144 may be made on rib bones 154 in a perpendicular fashion as shown in FIG. 10B.

Rib bones 154 may be marked on the cavity-side as depicted by scribe line 144. The associated membrane may be peeled back and further loosened and intercostal muscles present around each of rib bones 154 may be removed to expose a portion of rib bones 154 as shown in FIG. 10B. As shown and described, the length of the rib bone 154 exposed in step 187 impacts the size of the eye muscle that is present on the resulting bone-in meat portion 146 and bone-in meat product 147. The bone-in meat product may also be referred to as a "beef petite tomahawk."

Similar to the description regarding method 31 with reference to FIG. 4B, FIG. 10C depicts a posterior end view 18 of carcass segment 132 having an arcuate guide cut 144 within the meat portion member 142 at the posterior end 18 to provide a guide representing a desired resulting meat member 142 of the bone-in meat portion 146 to have a substantially consistent diameter spanning the length of bone-in meat portion 146, i.e., inner region of the arcuate guide cut 144, and leaving a sufficient thickness of meat 142 in the outer region of the arcuate guide cut 144 in order for boneless meat product 148 to have a consistent appearance. For the avoidance of doubt, the length of bone-in meat portion 146 is defined between the anterior end 16 and posterior end 18 thereof.

Figure 10D:
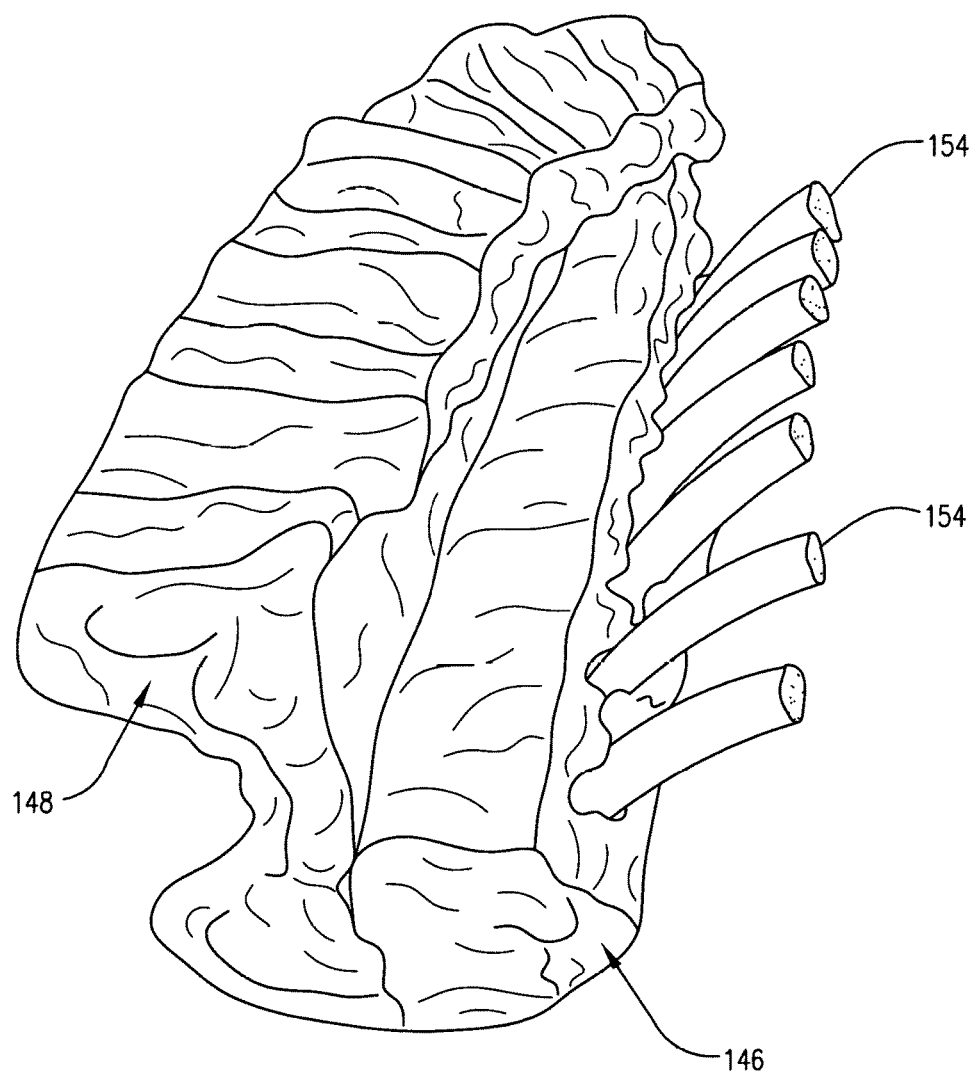
FIGS. 10D and 10E depict visual illustrations of a dividing step of the method depicted in FIG. 9.
Figure 10E:
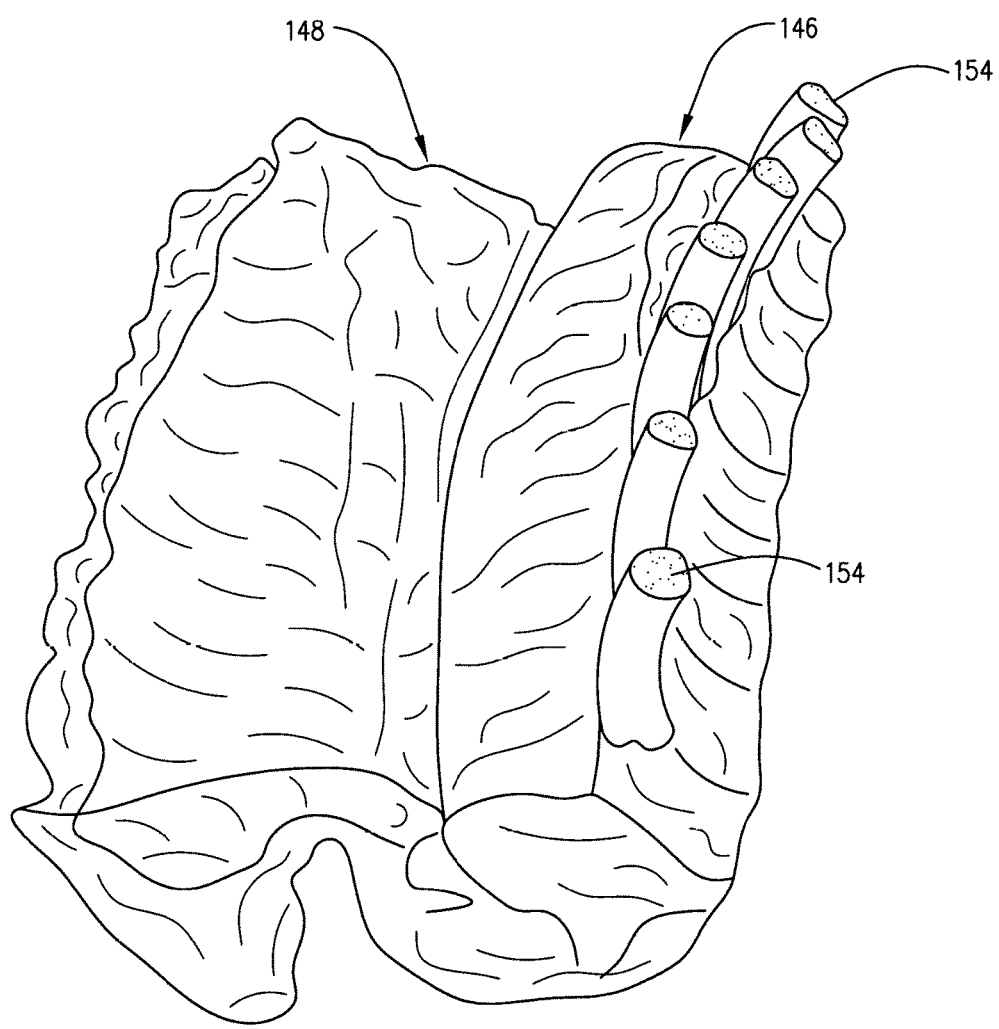
Figure 1F:

Method 131 includes dividing step 188 that divides carcass segment 132 along its length to thereby form boneless meat portion 148 and bone-in meat portion 146. FIGS. 10D and 10E depict dividing step 188 as viewed from the posterior end 18 of carcass segment 132. Dividing step 188 is generally done along guide cut line 144 depicted in FIG. 10B, which as previously described, follows the general curvature of carcass segment 132.

As previously described with reference to bone-in meat portion 46 of the pork carcass, bone-in meat portion 146 may have at least three rib bones 154 and has a length defined between an anterior end 16 and a posterior end 18 of bone-in meat portion 146. For example, the resulting meat member 142 present on the dorsal end of each rib bone 154 is substantially cylindrical in shape, including an elliptical-cylinder and may have a diameter of about 3 inches to about 4 inches along a major axis and a diameter of about 3 inches to about 4 inches along a minor axis of the resulting generally rounded meat member 142 of bone-in meat portion 146.

Figure 10G:
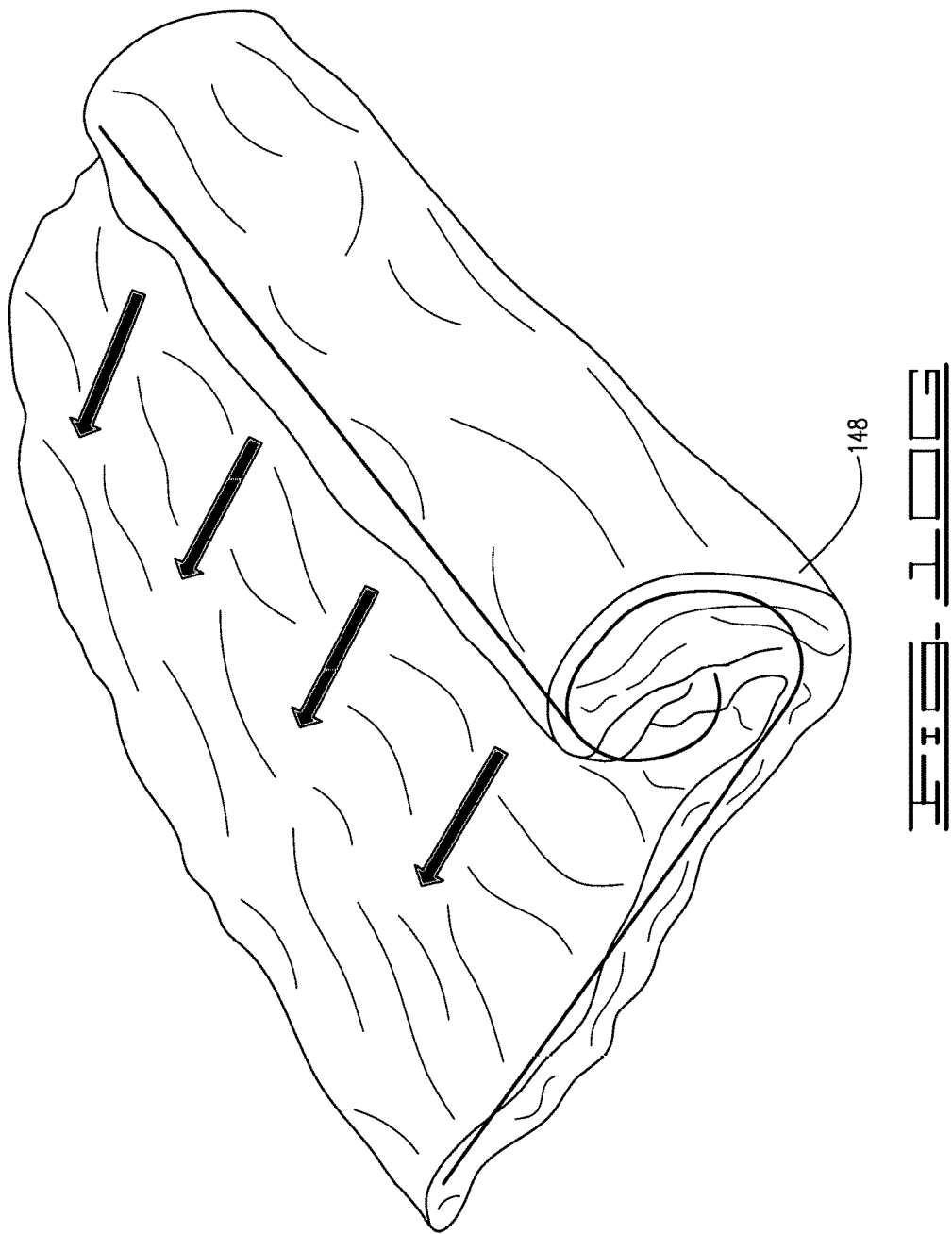
Figure 10H:
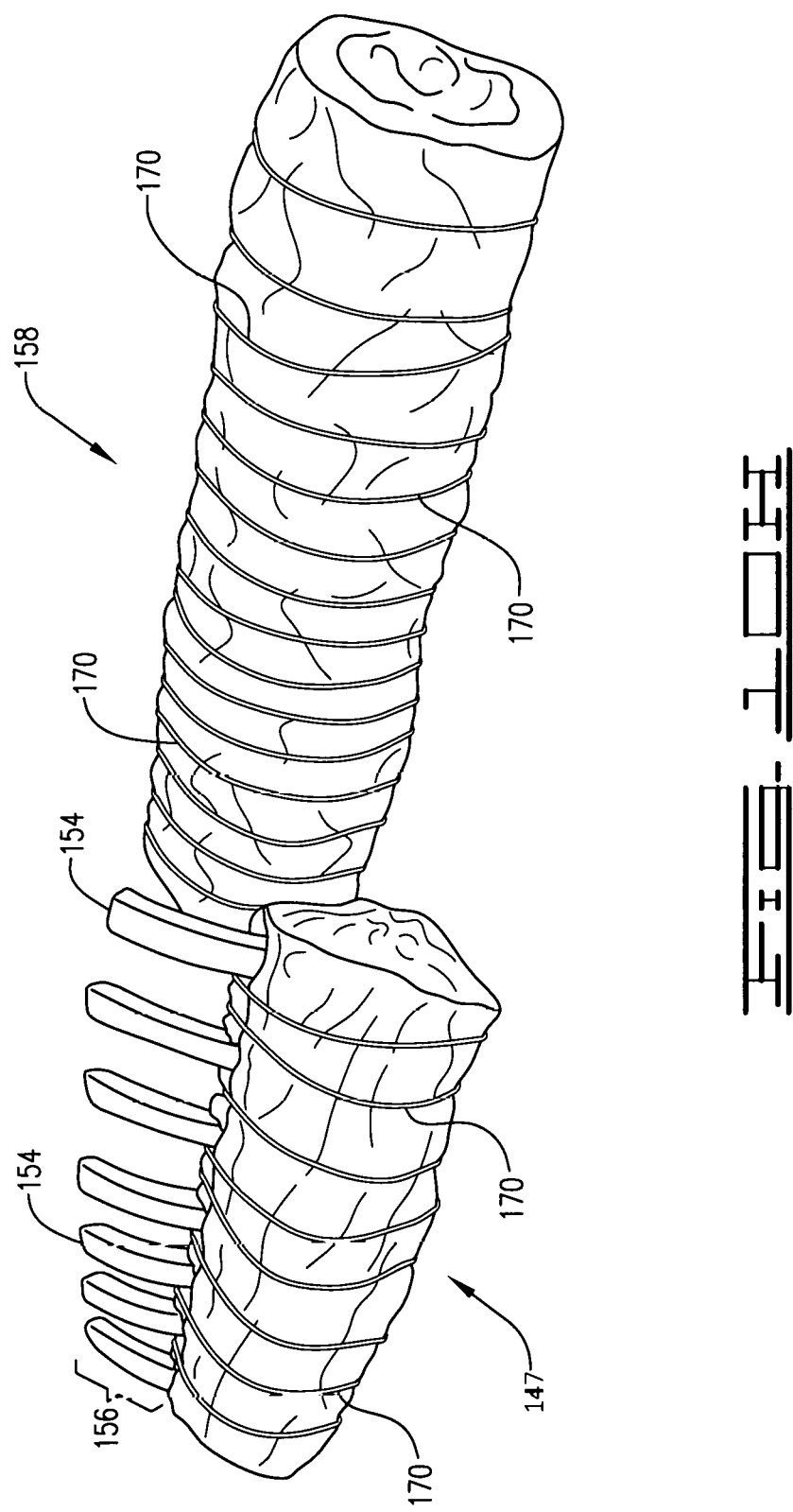

Bone-in meat portion 146 may undergo further processing steps, including a finishing step 190. Finishing step 190 may be accomplished by any techniques and devices known in the art. Finishing step 190 may include further exposing a length 156 of each rib bone 154 from the exposed rib tip down to and not including the remaining meat member 142 present on the second end of rib bone 154 to clean the rib bones 154 and thereby produce a bone-in meat product 147 as shown in FIGS. 10H and 10I. Such exposing step may be done by cleaning the rib bone 154 around its periphery to remove any remaining muscle, meat, or other materials that were not removed when a portion 156 of each rib bone 154 was exposed as described in relation to step 187. For example, cleaning the exposed bone and polishing the bone for aesthetically pleasing presentation may be achieved via water jets and/or any other cleaning and polishing process known in the art.

For example, non-limiting exemplary finishing steps 190 are depicted in box 192 of FIG. 9. Finishing steps 192 may also include securing bone-in meat portion 146 to maintain its shape and form, cleaning, polishing, seasoning, cutting into a plurality of smaller bone-in meat product pieces (not depicted) as previously described in relation to FIG. 2A, cooking, etc., and any combinations thereof. As previously described, securing may be done by tying, including the use of manual tying, automated tying, clipping via plastic heat proof clips or rings, e.g. metal rings, or other securing devices, including, without limitation, netting, trusses, strings 170, bags, or other any other securing methods and devices known in the art, or combinations of any of the foregoing.

As mentioned, dividing step 188 produces boneless meat portion 148. For example, boneless meat portion 148 may include the spinalis dorsi and longissimus dorsi muscles. A portion of the intercostals is also attached. The thickness of meat member 142 of the boneless meat portion 148 may range from about 3 inches to about 4 inches as measured between a ventral side and a dorsal side of boneless meat portion 148, depending on the size of the resulting meat member 142 of bone-in meat portion 146.

Following dividing step 188, boneless meat portion 148 is formed into a generally cylindrically-shaped meat portion along its length and thereby forms boneless meat product 158. Such forming step may include flattening step 193 to provide a substantially even boneless meat portion 148 as depicted in FIG. 10F in order to help ensure boneless meat product 158 has a consistent aesthetic appearance. For example, flattening step 193 may include one or more of the following: removing sinew, excess intermuscular fat, membrane(s), including tough membrane on the intercostal fingers 180, light hammering on the boneless meat portion 148, and combinations thereof. For some applications, it is desirable that flattened boneless meat portion 148 is about at least thirteen inches wide.

Not depicted in FIG. 9, prior to step 198, boneless meat portion 148 may be seasoned.

Method 131 includes a rolling or wrapping step 198 to form boneless meat product 158. For example, boneless meat product 158 may be referred to a "petite prime rib". For example, boneless meat portion 148 may be rolled across its width to form a substantially cylindrically-shaped boneless meat product having the length of boneless meat portion 148 as shown in FIG. 10G. Preferably, rolling step 198 is done in such a manner to form a tight resulting product in an effort to avoid having voids and gaps in the center of the resulting boneless meat product 158. The rolling step 198 may be accomplished by tucking in the intercostals into the center and rolling boneless meat portion 148 toward the spinalis muscle to enable the spinalis muscle to serve as the lip. Rolling step 198 may be done in reverse, e.g. tucking the spinalis muscle into the center and rolling boneless meat portion 148 toward the intercostals.

Once formed into the generally cylindrical shape and thereby forming the boneless meat product 158, boneless meat product 158 may optionally undergo one or more finishing steps 200. For example, non-limiting exemplary finishing steps are depicted in box 202 of FIG. 9. Finishing step 200 may include, securing boneless meat product 158 to maintain its shape as and form as shown in FIGS. 10H and 10I, cleaning, seasoning, cutting into a plurality of smaller boneless meat product pieces (not depicted), cooking, etc. Securing may be done by tying, including the use of manual tying, automated tying, clipping via plastic heat proof clips or rings, e.g. metal rings, or other securing devices, including, without limitation, netting, trusses, strings 170, bags, or other any other securing methods and devices known in the art, or combinations of any of the foregoing. Cooking may include any cooking method known in the art including sous vide method and/or roasting.

Not depicted in the figures, another example of forming a boneless meat product is disclosed. For example, a boneless meat product may also be formed as follows: taking a dimensionally adjusted thickness of fat, i.e. fat having a desired thickness, and positioning the dimensionally adjusted thickness of fat in a mold. Then a loin or other boneless meat portion may be placed into the mold. The fat and boneless meat portion may be folded such that the dimensionally adjusted thickness of fat is substantially wrapped around the boneless meat portion to form a generally round and cylindrically-shaped boneless meat product made from at least two distinct pieces of material.

Not depicted in the figures, another example of forming a boneless meat product is disclosed. The boneless meat product may have the appearance of the boneless meat product depicted in FIG. 7 and may also be formed by using a separate piece of fat that is not directly attached to the meat 42 as depicted in reference to FIGS. 4B, 4F, and 6A. For example, a boneless meat product may be formed by using a separate piece of fat that has been dimensionally shaped to a certain thickness and wrapped around a denuded loin or sirloin meat portion.

The disclosed methods and techniques are capable of producing one or more bone-in meat portions and products and one or more boneless meat productions that can be valued up beyond its alternative trim value. The described methods and techniques may also be used in connection with other animal carcasses, for example, including but not limited to, beef, lamb, bison, venison, goat, ostrich, alligator, llama, kangaroo, etc.

The new processing and cutting techniques of the described methods herein and the associated meat product and/or meat products produced by the applicable method allow fabricators to more effectively utilize animal carcasses. The described methods and techniques address the issues fabricators face as a result of increased carcass sizes. The resulting meat products yielded from the described methods and techniques are products of desirable portion-sizes for consumers and products that have an appearance similar to a recognizable cut of meat with which consumers are familiar.

Although certain steps are described herein and illustrated in the figures as occurring sequentially, some steps may occur simultaneously with each other or in an order that is not depicted. The present disclosure of the disclosed methods, techniques, functions, and products produced therefrom are not to be limited to the precise descriptions and illustrations. Other embodiments will be apparent to one skilled in the art. As such, the foregoing description merely enables and describes the general products, methods, and uses disclosed herein. While certain embodiments have been described for the purpose of this disclosure, those skilled in the art can make changes without departing from the spirit and scope thereof. Thus, the appended claims define what is claimed.

What is claimed is:

1. A method of forming a bone-in meat portion and a boneless meat product from a carcass segment, the carcass segment having at least three rib bones and the carcass segment having a length defined between an anterior end and a posterior end, the method comprising the steps of:
   dividing said carcass segment along said length of said carcass segment and thereby forming a boneless meat portion and a bone-in meat portion, wherein said bone-in meat portion has said at least three rib bones, wherein said bone-in meat portion has a length defined between an anterior end and posterior end of said bone-in meat portion and said boneless meat portion has a length defined between an anterior end and a posterior end of said boneless meat portion and said boneless meat portion includes a meat member that has a thickness of at least 1 inch as measured between a ventral side and a dorsal side of said boneless meat portion;
   wherein said bone-in meat portion includes a generally rounded meat member attached to one end of each of said at least three rib bones and said generally rounded meat member spans said length of said bone-in meat portion and said generally rounded meat member has a diameter of about at least 2.5 inches; and
   forming said boneless meat portion into a generally cylindrically-shaped meat portion along said length of said boneless meat portion and thereby forming said boneless meat product.

2. The method of claim 1, wherein said carcass segment is that of pork, beef, lamb, or venison.

3. The method of claim 2, wherein said carcass segment is pork.

4. The method of claim 3 further comprising the step of: on said bone-in meat portion, exposing a portion of each of said at least three rib bones by removing muscle present around a periphery of each said at least three rib bones and up to said generally rounded meat member spanning said length of said bone-in meat portion.

5. The method of claim 2, wherein said carcass segment is beef.

6. The method of claim 1, wherein said carcass segment is a pork loin with said at least three rib bones and a posterior portion having a lumbar bone segment removed.

7. The method of claim 1 further comprising the step of: wherein said carcass segment is a pork loin primal cut including a fat cap and skin, and prior to the step of dividing said carcass segment along said length, dividing said carcass segment into a first piece and a second piece, wherein said first piece includes said at least three rib bones and said second piece includes a lumbar bone segment.

8. The method of claim 7 further comprising the step of: removing said lumbar bone segment from said second piece.

9. The method of claim 8 further comprising the step of: after the step of removing said lumbar bone segment, dividing said second piece into at least two smaller boneless meat segments.

10. The method of claim 9 further comprising the step of: placing said at least two smaller boneless meat segments on a loin meat portion of said boneless meat portion and enveloping said at least two smaller boneless meat segments with said boneless meat portion to thereby form said boneless meat product.

11. The method of claim 10 further comprising the step of: prior to said enveloping said at least two smaller boneless meat segments with said boneless meat portion step, creating an extension flap of said boneless meat portion, wherein creating an extension flap includes partially dividing said fat cap across a width of said boneless meat portion from a starting end on a first side to a fixed point near a second end distal from said starting end where such dividing step leaves a portion of fat attached to meat of said loin of said boneless meat portion, and said forming said boneless meat product includes enveloping said at least two smaller boneless meat segments with said extension flap.

12. The method of claim 11, wherein creating an extension flap includes, prior to partially dividing said fat cap, partially dividing said skin from said fat cap across said width of said boneless meat portion from a starting end on said second side to a fixed point near said first end distal from said starting end.

13. The boneless meat product produced by the method of claim 10.

14. The method of claim 8, wherein the step of removing said lumbar bone segment from said second piece includes removing skin from said second piece.

15. The method of claim 8 further comprising the step of: after the step of removing said lumbar bone segment, dividing said second piece in a serpentine manner to produce and thereby partially divide said second piece into at least two smaller boneless segments that are connected to each other as a single piece of material.

16. The method of claim 15 further comprising the step of: placing said at least two smaller boneless meat segments on a loin meat portion of said boneless meat portion and enveloping said at least two smaller boneless meat segments with said boneless meat portion to thereby form said boneless meat product.

17. The method of claim 16 further comprising the step of: prior to said enveloping said at least two smaller boneless meat segments with said boneless meat portion step, creating an extension flap of said boneless meat portion, wherein creating an extension flap includes partially dividing said fat cap across a width of said boneless meat portion from a starting end on a first side to a fixed point near a second end distal from said starting end where such dividing step leaves a portion of fat attached to meat of said loin of said boneless meat portion, and said forming said boneless meat product includes enveloping said at least two smaller boneless meat segments with said extension flap.

18. The method of claim 17, wherein creating an extension flap includes, prior to partially dividing said fat cap, partially dividing said skin from said fat cap across said width of said boneless meat portion from a starting end on said second side to a fixed point near said first end distal from said starting end.

19. The method of claim 1 further comprising the step of: on said bone-in meat portion, exposing a portion of each of said at least three rib bones by removing muscle present around a periphery of each said at least three rib bones and up to said generally rounded meat member spanning said length of said bone-in meat portion.

20. The method of claim 19 further comprising the step of: dividing said bone-in meat portion by cutting between one or more exposed rib bones of said at least three rib bones to form a plurality of bone-in meat products.

21. The method of claim 19 further comprising the step of: cleaning said exposed rib bones of said at least three rib bones to remove any remaining muscle or other materials that was not removed during said exposing a portion of each of said at least three rib bones step.

22. The bone-in meat product produced by the method of claim 19.

23. The method of claim 1 further comprising the step of: wherein said carcass segment is beef, flattening said boneless meat portion to provide a substantially even surface.

24. The method of claim 23 further comprising the step of: rolling said boneless meat portion across a width to form a substantially cylindrically shaped boneless meat product having said length of said boneless meat portion.

25. The method of claim 24 further comprising the step of: seasoning said boneless meat portion prior to the step of rolling.

26. The boneless meat product produced by the method of claim 24.

27. The method of claim 1 further comprising the step of: wherein said carcass segment is a 109 beef rib and prior to the step of dividing said carcass segment along said length of said carcass segment, exposing a portion of each of said at least three ribs by removing muscle present around a periphery of each of said at least three rib bones and up to a length on each rib bone measured from a ventral side toward a dorsal side of each of said rib bone.

28. The bone-in meat product formed by the method of claim 27.

29. A boneless meat product that is substantially cylindrically-shaped comprising:
a meat portion wrapped in and surrounded by a continuous layer of fat, wherein said meat portion has a thickness as measured between a ventral side and a dorsal side of said meat portion, wherein said continuous layer of fat is formed by splitting a fat member attached with said meat portion into a flap portion and a stationary portion of fat with said stationary portion of fat remaining attached to said meat portion, wherein said fat member has a thickness defined between a ventral side and a dorsal side of said fat member, and said thickness of said fat member is greater than said thickness of said meat portion, and wherein said flap portion is in contact with an exposed surface of said meat portion.

30. The boneless meat product of claim 29, wherein said meat portion is a pork loin and wherein said boneless meat product is approximately 4 inches in diameter.

31. The boneless meat product of claim 29, wherein said thickness of said meat portion is about at least one inch and said thickness of said fat member is about at least two inches.

32. A method of forming a boneless meat product from a sirloin sub-primal of a pork carcass segment, the pork carcass segment including an export belly, a sirloin meat portion, skin, and fat attached to said pork carcass segment, the method comprising the steps of:
forming a flap of skin and fat portions of said export belly by dividing a meat portion of said export belly from said skin and said fat portions of said pork carcass segment attached to said export belly thereby removing said meat portion of said export belly from said carcass segment while leaving substantially intact said fat and skin portions of said export belly attached to skin and fat portions of said sirloin meat portion; and
forming said boneless meat product by wrapping said flap substantially around said sirloin meat portion and said skin and fat portions attached to said sirloin meat portion, wherein said boneless meat product is generally cylindrically-shaped.

33. The method of claim 32 further comprising the step of: cutting said boneless meat product into a plurality of smaller boneless meat products, wherein each of said plurality of boneless meat products is generally cylindrically-shaped.

34. A boneless pork sirloin meat product that is substantially cylindrically-shaped comprising:
a boneless meat portion wrapped in and surrounded by a continuous layer of skin, wherein said continuous layer of skin includes skin attached to a portion of said meat portion and a skin flap formed by removing a belly portion from a sirloin portion without removing skin attached to said belly portion thereby forming said skin flap portion of said continuous layer of skin.

\* \* \* \* \*